US 8,726,035 B2

(12) United States Patent
Oxford

(10) Patent No.: US 8,726,035 B2
(45) Date of Patent: May 13, 2014

(54) METHOD AND SYSTEM FOR A RECURSIVE SECURITY PROTOCOL FOR DIGITAL COPYRIGHT CONTROL

(75) Inventor: William V. Oxford, Austin, TX (US)

(73) Assignee: Krimmeni Technologies, Inc., Austin, TX (US)

( * ) Notice: Subject to any disclaimer, the term of this patent is extended or adjusted under 35 U.S.C. 154(b) by 77 days.

(21) Appl. No.: 12/788,516

(22) Filed: May 27, 2010

(65) Prior Publication Data

US 2010/0235644 A1 Sep. 16, 2010

Related U.S. Application Data

(63) Continuation of application No. 12/251,669, filed on Oct. 15, 2008, now Pat. No. 7,747,876, which is a continuation of application No. 11/710,352, filed on Feb. 23, 2007, now Pat. No. 7,457,968, which is a continuation of application No. 10/465,274, filed on Jun. 19, 2003, now Pat. No. 7,203,844.

(60) Provisional application No. 60/390,180, filed on Jun. 20, 2002.

(51) Int. Cl.
*G06F 12/14* (2006.01)

(52) U.S. Cl.
USPC ........... 713/189; 713/190; 713/191; 713/192; 713/193

(58) Field of Classification Search
None
See application file for complete search history.

(56) References Cited

U.S. PATENT DOCUMENTS

| 4,656,474 A | | 4/1987 | Mollier et al. |
| 4,893,339 A | | 1/1990 | Bright et al. |
| 5,029,207 A | | 7/1991 | Gammie |
| 5,210,748 A | * | 5/1993 | Onishi et al. ................. 370/405 |
| 5,210,870 A | * | 5/1993 | Baum et al. ................... 707/752 |
| 5,222,136 A | * | 6/1993 | Rasmussen et al. .......... 380/266 |
| 5,285,497 A | | 2/1994 | Thatcher |
| 5,623,545 A | * | 4/1997 | Childs et al. ....................... 380/2 |
| 5,631,961 A | * | 5/1997 | Mills et al. ..................... 380/286 |
| 5,764,774 A | | 6/1998 | Liu |
| 5,912,974 A | * | 6/1999 | Holloway et al. ............... 380/51 |
| 6,055,314 A | * | 4/2000 | Spies et al. ..................... 380/228 |
| 6,088,677 A | | 7/2000 | Spurgeon |

(Continued)

FOREIGN PATENT DOCUMENTS

| GB | 2341955 | 3/2000 |
| JP | 2003101526 | 4/2003 |

(Continued)

OTHER PUBLICATIONS

Microsoft (Microsoft Computer Dictionary, Fifth Edition, ISBN 978-0-7356-1495-6, May 2002), p. 50.*

(Continued)

*Primary Examiner* — Peter Poltorak
(74) *Attorney, Agent, or Firm* — Sprinkle IP Law Group

(57) ABSTRACT

Systems and methods are described which utilize a recursive security protocol for the protection of digital data. These may include encrypting a bit stream with a first encryption algorithm and associating a first decryption algorithm with the encrypted bit stream. The resulting bit stream may then be encrypted with a second encryption algorithm to yield a second bit stream. This second bit stream is then associated with a second decryption algorithm. This second bit stream can then be decrypted by an intended recipient using associated keys.

29 Claims, 7 Drawing Sheets

(56) References Cited

U.S. PATENT DOCUMENTS

| | | | |
|---|---|---|---|
| 6,101,605 | A | 8/2000 | Buer |
| 6,226,742 | B1 | 5/2001 | Jakubowski et al. |
| 6,269,445 | B1 * | 7/2001 | Nishioka et al. ............. 713/168 |
| 6,327,652 | B1 | 12/2001 | England et al. |
| 6,330,670 | B1 | 12/2001 | England et al. |
| 6,367,019 | B1 | 4/2002 | Ansell |
| 6,398,245 | B1 | 6/2002 | Gruse et al. |
| 6,412,070 | B1 | 6/2002 | Van Dyke et al. |
| 6,654,889 | B1 * | 11/2003 | Trimberger ............... 713/191 |
| 6,681,214 | B1 * | 1/2004 | Doljack ..................... 705/75 |
| 6,701,432 | B1 | 3/2004 | Deng et al. |
| 6,839,849 | B1 | 1/2005 | Ugon et al. |
| 7,185,369 | B2 * | 2/2007 | Thoone et al. ................. 726/30 |
| 7,203,844 | B1 | 4/2007 | Oxford |
| 7,225,333 | B2 * | 5/2007 | Peinado et al. ............. 713/164 |
| 7,328,345 | B2 | 2/2008 | Morten et al. |
| 7,457,968 | B2 | 11/2008 | Oxford |
| 7,639,819 | B2 * | 12/2009 | Ho et al. ..................... 380/277 |
| 7,747,876 | B2 | 6/2010 | Oxford |
| 8,438,392 | B2 | 5/2013 | Oxford |
| 2001/0033656 | A1 * | 10/2001 | Gligor et al. ................ 380/28 |
| 2002/0013772 | A1 | 1/2002 | Peinado |
| 2002/0138435 | A1 | 9/2002 | Williams et al. |
| 2002/0147920 | A1 * | 10/2002 | Mauro ....................... 713/200 |
| 2002/0152387 | A1 | 10/2002 | Asano |
| 2003/0084298 | A1 * | 5/2003 | Messerges et al. .......... 713/176 |
| 2003/0084306 | A1 | 5/2003 | Abburi et al. |
| 2003/0097578 | A1 * | 5/2003 | England et al. ............. 713/191 |
| 2003/0177435 | A1 | 9/2003 | Budd et al. |
| 2004/0016002 | A1 * | 1/2004 | Handelman et al. ......... 725/152 |
| 2005/0021941 | A1 | 1/2005 | Ohmori et al. |
| 2005/0058291 | A1 | 3/2005 | Candelore |
| 2006/0101524 | A1 | 5/2006 | Weber |
| 2006/0253714 | A1 | 11/2006 | Ito |
| 2006/0265568 | A1 | 11/2006 | Burton |
| 2008/0240420 | A1 | 10/2008 | Oxford |
| 2010/0122088 | A1 | 5/2010 | Oxford |
| 2010/0281220 | A1 | 11/2010 | Cantin et al. |
| 2011/0225168 | A1 | 9/2011 | Burroughs et al. |
| 2013/0227302 | A1 | 8/2013 | Oxford |
| 2013/0238902 | A1 | 9/2013 | Oxford |
| 2013/0254494 | A1 | 9/2013 | Oxford |

FOREIGN PATENT DOCUMENTS

| | | |
|---|---|---|
| JP | 2003234728 | 8/2003 |
| JP | 2006222496 | 8/2006 |
| WO | WO-2004-040397 A2 * | 5/2004 |
| WO | WO2006080754 | 8/2006 |

OTHER PUBLICATIONS

Stallings (William Stallings, "Cryptography and network security", 2th edition, 1998, ISBN: 0138690170), p. 237-263 and 271-314.*

Lie et al., "Architectural Support for Copy and Tamper-Resistant Software", 9th Annual Conf. on Architectural Support for Programming Languages . . . , Cambridge MA, 2000, pp. 1-10.

Office Action mailed Aug. 23, 2007 for U.S. Appl. No. 11/710,352, 4 pages.

International Search Report and Written Opinion mailed Sep. 26, 2008 for PCT/US2007/005803, 8 pages.

International Preliminary Report on Patentability for PCT/US2007/005803, mailed Sep. 17, 2009, issued Sep. 8, 2009, 5 pages.

Office Action mailed Sep. 25, 2009 for U.S. Patent Application. No. 12/251,669, 5 pages.

International Search Report and Written Opinion for PCT/US2009/063861, completed Dec. 23, 2009, mailed Jan. 12, 2010, 8 pages.

Roger M. Needham and Michael D. Schroeder, "Using Encryption for Authentication in Large Networks of Computers," Communications of the ACM, vol. 21, No. 12, Dec. 1978, pp. 993-999.

Shimson Berkovits, "How to Broadcast a Secret", Advances in Cryptology: EUROCRYPT'91, Lecture notes in Computer Science, 1991, pp. 536-541.

Shafi Goldwasser and Silvio Micali, "Probabalistic Encryption," Journal of Computer and System Sciences, vol. 28, No. 2. Apr. 1984, pp. 270-299.

Office Action issued for Japanese Patent Application No. 2009-552649 mailed Jun. 20, 2012, 9 pages.

Office Action for U.S. Appl. No. 12/615,843, mailed Sep. 26, 2012, 8 pgs.

Menezes, Alfred J. et al., "Handbook of applied cryptography," Ch. 9, Oct. 1996, pp. 321-383, ISBN: 0849385237.

Notice of Allowance for U.S. Appl. No. 12/615,843, mailed Jan. 2, 2013, 4 pgs.

Extended EP Search Report issued for European Patent Application No. 07 772 246.0, mailed Jan. 19, 2012, 8 pages.

International Preliminary Report on Patentability (IPRP) as issued for PCT Application No. PCT/US2009/063861, mailed May 19, 2011, 8 pages.

Office Action (with English translation) for Japanese Patent Application No. 2009-552649, mailed Apr. 3, 2013, 10 pgs., Japanese Patent Office.

Office Action for U.S. Appl. No. 13/745,236, mailed Aug. 8, 2013, 8 pgs.

International Search Report and Written Opinion for International Patent Application No. PCT/US2013/033009, mailed Jun. 18, 2013, 10 pgs.

Office Action issued for Japanese Patent Application No. JP2011-535761, mailed Dec. 5, 2013, 12 pages.

Office Action issued for Japanese Patent Application No. 2012-276507, mailed Jan. 7, 2014, 14 pages.

Final Office Action issued for Japanese Patent Application No. 2009-552649, mailed Feb. 26, 2014, 11 pages.

* cited by examiner

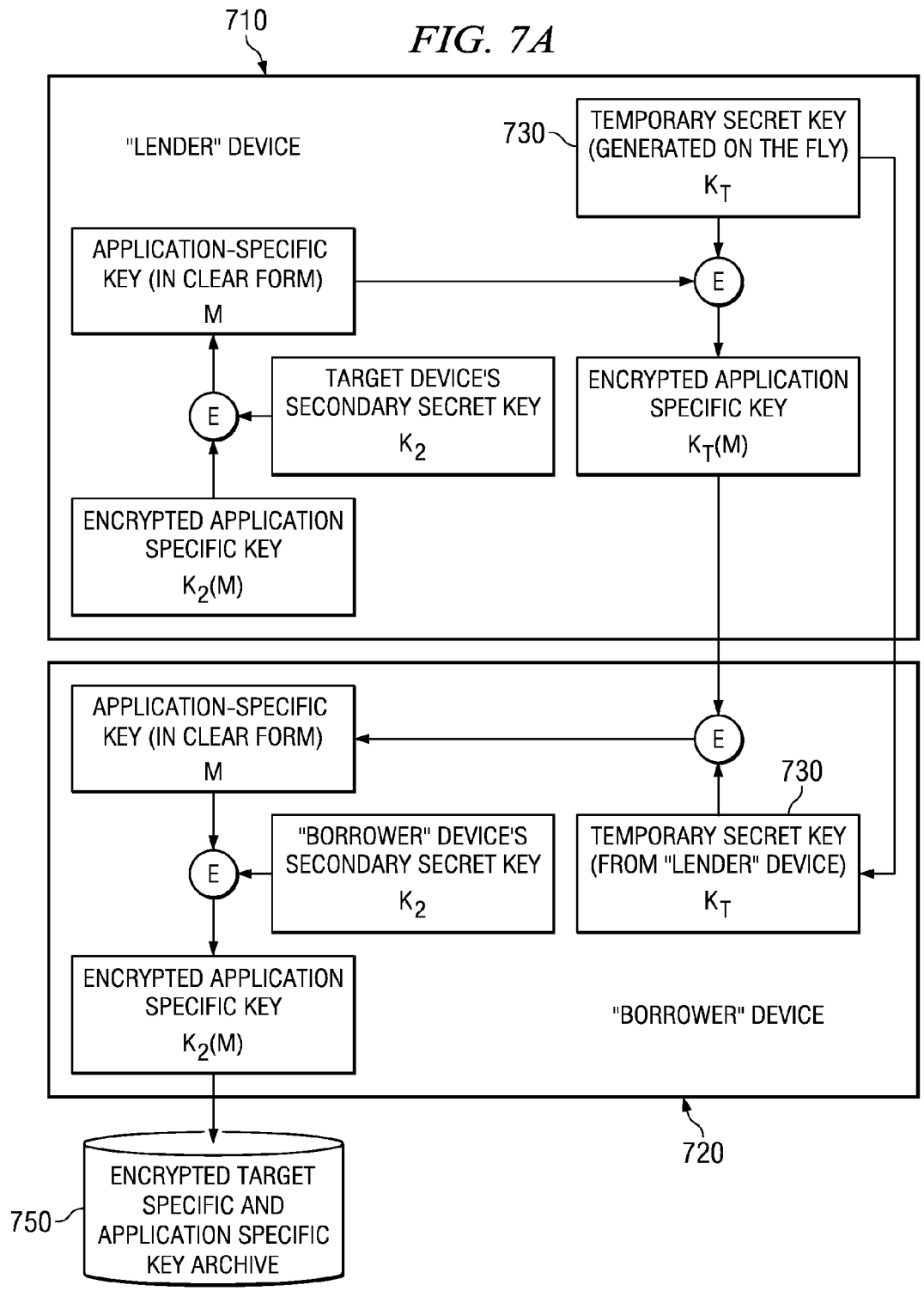

FIG. 7B

① "BORROWER" AND "LENDER" DEVICES SET UP SECURE COMMUNICATIONS CHANNEL USING TEMPORARY PKI KEY PAIRS TO EFFECT SECURE TEMPORARY SECRET KEY EXCHANGE PROCESS. "BORROWER" DEVICE REQUESTS ONE OR MORE APPLICATION OR MEDIA STREAM SPECIFIC KEYS ALONG WITH A REQUESTED "LOAN DURATION" FOR EACH OF THE REQUESTED KEYS FROM THE "LENDER" DEVICE.

② "LENDER" DEVICE DETERMINES THAT IT IS IN CURRENT POSSESSION OF THE CORRESPONDING KEY(S) BY SEARCHING THROUGH ITS PERMANENT AND TEMPORARY KEY LIST DATA STRUCTURES. IF SO, THEN IT PLACES THE REQUESTED KEY(S) ON ITS TEMPORARY KEY LIST AS HAVING BEEN "CHECKED OUT" FOR A SHORT PERIOD OF TIME (THE "CHECKOUT NEGOTIATION TIMEOUT PERIOD") AND THEN RESPONDS TO THE "BORROWER" UNIT WITH AN ENCRYPTED LIST CONTAINING THE AVAILABLE KEY(S) ALONG WITH THEIR CORRESPONDING "LOAN EXPIRATION TIMES". THE VALUE USED FOR ENCRYPTING THIS KEY LIST IS A TEMPORARY SECRET KEY WHICH IS GENERATED ON THE FLY BY THE "LENDER" UNIT. THE NEW KEY EXPIRATION PERIOD IS BASED ON THE LESSER OF THE REQUESTED "LOAN DURATION" PERIOD AND THE MAXIMUM LOAN DURATION ALLOWED BY THE "BORROWER" UNIT.

③ "BORROWER" UPDATES ITS INTERNAL KEY LIST TIMEOUT REGISTER TO REFLECT THE NEW LOAN EXPIRATION TIMES (IF NECESSARY). "BORROWER" THEN ACKNOWLEDGES THE RECEIPT OF THE ENCRYPTED KEY LIST AND OF THE NEGOTIATED "LOAN DURATION(S)" BY RETURNING A MESSAGE DIGEST CALCULATED FROM THE ENCRYPTED KEY LIST RECEIVED IN STEP 2.

④ "LENDER" DEVICE EXTENDS THE "CHECKOUT PERIOD" FOR EACH OF THE REQUESTED KEYS AND THEN SENDS THE TEMPORARY SECRET KEY WHICH IT USED IN STEP 2 TO ENCODE THE KEY LIST TO THE "BORROWER" DEVICE.

⑤ "BORROWER" USES THE SECRET KEY TO DECRYPT THE KEY LIST MESSAGE RECEIVED IN STEP 2 AND THEN UPDATES ITS TEMPORARY KEY LIST DATA STRUCTURE.

⑥ UPON EXPIRATION OF EACH OF THE TEMPORARY KEYS, BOTH UNITS UPDATE THEIR TEMPORARY KEY LISTS AND KEY LIST TIMEOUT REGISTERS.

METHOD AND SYSTEM FOR A RECURSIVE SECURITY PROTOCOL FOR DIGITAL COPYRIGHT CONTROL

RELATED APPLICATIONS

This application is a continuation of and claims a benefit of priority under 35 U.S.C. §120 to U.S. patent application Ser. No. 12/251,669, "METHOD AND SYSTEM FOR A RECURSIVE SECURITY PROTOCOL FOR DIGITAL COPYRIGHT CONTROL" by William V. Oxford, filed Oct. 15, 2008; which is a continuation of and claims a benefit of priority under 35 U.S.C. §120 to U.S. patent application Ser. No. 11/710,352, entitled "METHOD AND SYSTEM FOR A RECURSIVE SECURITY PROTOCOL FOR DIGITAL COPYRIGHT CONTROL" by William V. Oxford, filed Feb. 23, 2007, which has since issued as U.S. Pat. No. 7,457,968, on Nov. 25, 2008; which is a continuation of and claims a benefit of priority under 35 U.S.C. §120 to U.S. patent application Ser. No. 10/465,274, entitled "METHOD AND SYSTEM FOR A RECURSIVE SECURITY PROTOCOL FOR DIGITAL COPYRIGHT CONTROL" by William V. Oxford, filed Jun. 19, 2003, which has since issued as U.S. Pat. No. 7,203,844, on Apr. 10, 2007; which claims a benefit of priority under 35 U.S.C. §119 to U.S. Provisional Patent Application No. 60/390,180 entitled "A RECURSIVE SECURITY PROTOCOL SYSTEM AND METHOD FOR DIGITAL COPYRIGHT CONTROL" by William V. Oxford, filed Jun. 20, 2002. All applications cited within this paragraph are fully incorporated herein by reference.

TECHNICAL FIELD OF THE INVENTION

This invention relates in general to the protection of digital content, and more particularly, to the protection of digital data through the use of encryption. Even more particularly this invention relates to protecting digital content with a recursive security protocol which provides both greater security and greater flexibility than currently utilized methods.

BACKGROUND OF THE INVENTION

The practice of copyright law in the past has depended on the difficulty of reproducing some physical object, whether it be a printed book, a recorded disc or a tape. To be complete, it has always been possible for an individual to reproduce such objects, but it has typically not been economically viable, given either the time cost or opportunity cost of transcribing the information contained in the physical object to another. Also, the copies resulting from this process have, until now, tended to be of a lesser quality than the original. However, with the advent of digital storage of information, this balance of costs has been upset.

The value of a copyrighted work is not necessarily imbued in the physical object which contains the creation, but rather in the information which makes up the work itself. Thus, when the opportunity cost of duplicating the work becomes vanishingly small (as is the case for many digital media streams today), the copyright protection process has to deal with that issue in a new manner. Essentially, all creations that can be encapsulated in digital form are subject at some point to this concern.

Although it may be impractical to duplicate a given large digital data stream at this point in time, the cost of duplication and storage of such data streams is constantly declining, as is the cost of transmitting those data over long distances. Also, digital storage allows one to make perfect copies that do not degrade over time or through repeated use. As such, the lifetime of these large data sets can potentially outlive their economic viability, at which point, it is of much lower consequence whether the stream is open for free distribution or not. This length of viability places an upper limit on the amount of security that is appropriate for use in controlling access to the data.

The current state of the public art in digital security algorithms can be readily gleaned through a perusal of online information or via the various publications and patents which examine this subject, some of the more recent of which include U.S. Pat. No. 6,327,652; U.S. Pat. No. 6,330,670; U.S. Pat. No. 6,412,070; U.S. Patent Publication No. 20020013772; U.S. Pat. No. 6,226,742; U.S. Pat. No. 6,101,605; and "Architectural Support for Copy and Tamper-Resistant Software, by David Lie, et al. (Proceedings of the 9th Annual Conference on Architectural Support for Programming Languages and Operating Systems aka ASPLOS-IX, Cambridge, Mass. 2000) all of which are fully incorporated fully herein by reference.

Prior art systems utilize a few basic operational categories of digital data encryption and decryption technologies. These categories are based on the use of the security algorithms themselves and are independent of the actual mechanism for encrypting or decrypting the actual data. These well-known technologies and widely described classifications and technologies are:

One-Way Hashing mechanisms and/or Message Digests.
Message Authentication Systems
Digital Signatures
Secret Key Encryption Systems
Public Key Encryption Systems The means by which these technologies are used in a given security system is known as a security protocol. Note that the security protocol is independent of the actual underlying mechanics of how the various functions are implemented. As such, even a perfectly secure encryption algorithm may potentially be used inside a security protocol that compromises overall security in such as way as to defeat the secure aspect of the encryption technology itself. Consequently, the overall security of any given security system is dependent not only on the relative strength of the underlying security technologies but also by the way in which these security technologies are put into use. Prior attempts at implementing security system have made (artificial) distinctions between the various types of bit streams to be protected. On a fundamental level, all binary digital data can be reduced to a stream of 1's and 0's (a bitstream), which can be stored and retrieved in a manner which is completely independent of the intended purpose or interpretation of that bitstream. The fact that the data contained in any particular bitstream is used to convey a piece of text or a photograph or even a piece of executable object code is not relevant to the manner in which or the device where the bitstream is stored.

Thus, there is a need for security protocols which do not depend on an arbitrary distinction between digital data types. These protocols, which may utilize industry standard security technologies and other types of security standards to better and more efficiently protect digital content, may themselves be expressed in terms of a digital bitstream. Thus, such a protocol would be equally capable of securing itself. This self-referencing behavior is known as the property of "recursion" and such a security protocol may be termed a "Recursive Security Protocol".

SUMMARY OF THE INVENTION

Systems and methods for security protocols, which may utilize a variety of encryption techniques to better protect digital content are disclosed. These systems and methods allow one to encode any bit stream (for example, an audio/video stream or other digital data, such as a software application) in a manner which allows a user to make as many backup copies of the original data set as they wish, but which may still require permission of any copyright holders in order to make use of such copies. In many embodiments, the bit stream is encrypted and this result is associated with a decryption algorithm. This combination is in turn encrypted, with the result of this second encryption yielding a second bit stream, which is in turn associated with a second decryption algorithm.

Additionally, systems are presented which embody these types of methodologies in computer systems, hardware, and software that are suitable to implement these security protocols.

In some embodiments, each bit stream is decrypted using the associated decryption algorithm and one or more keys.

In another embodiment, these keys may reside on a server or the keys may reside in hardware on the target machine.

In yet other embodiments, these keys are contained in a key data structure.

Still other embodiments include a key list data structure containing one or more key data structures.

More specific embodiments include this key list data structure residing on a central server.

In another set of embodiments a message digest is used to determine if an encrypted bit stream is genuine.

In other similar embodiments, a message digest is used to determine if a decrypted bit stream is genuine.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 7 is a diagram of an embodiment of the temporary key ownership transfer procedure.

DESCRIPTION OF PREFERRED EMBODIMENTS

Figure 1:
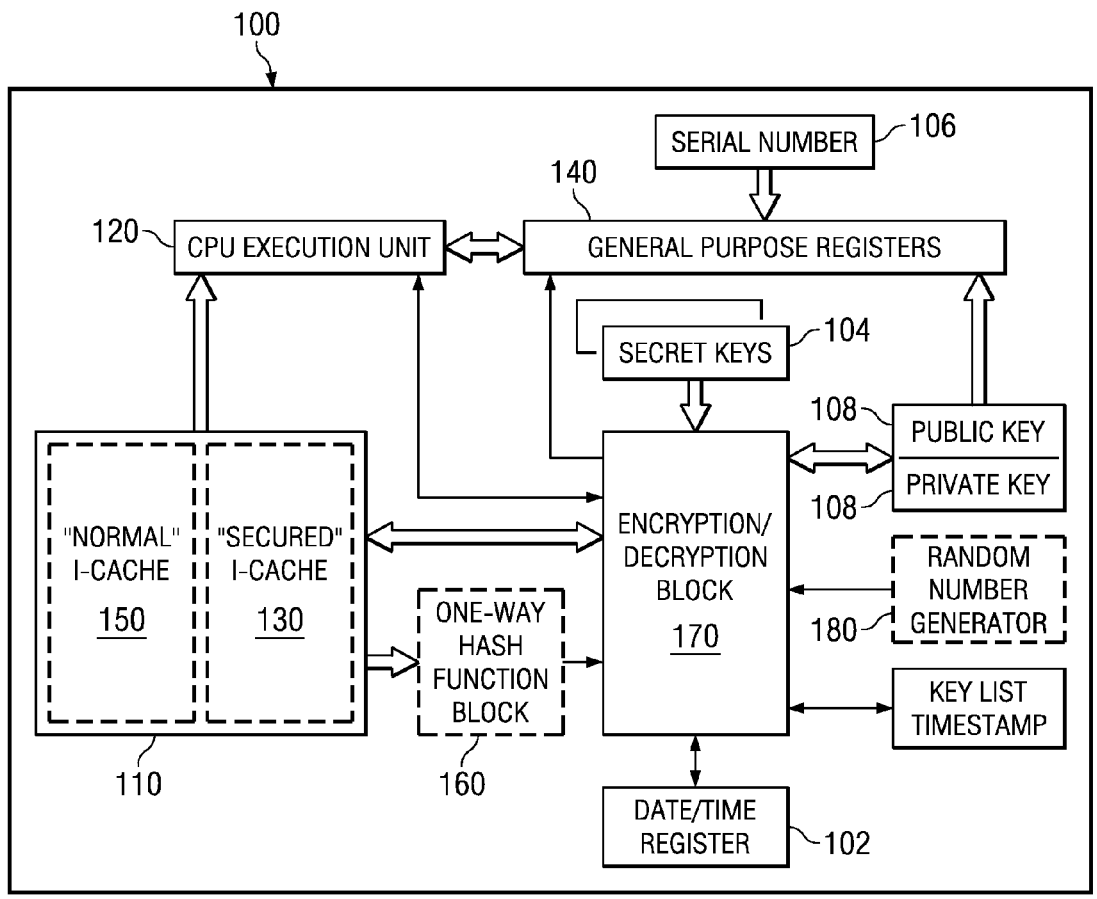
FIG. 1 is a block diagram of an embodiment of a security protocol engine.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Attention is now directed to systems and methods for security protocols intended to protect digital content. These security protocols are useable for any digital content, and can also support the concept of identity tracing that is normally associated with a traditional watermarking scheme without requiring that the actual digital content be altered. Since these protocols are based on the premise that all digital bit streams are equal, it can even be used in a recursive fashion in order to control access to updates to the protocol itself. In other words, the protocol makes no distinction between types of digital data, whether the data be media streams to be protected, the executable code required to play those streams, the encrypted executable code required to play those streams, the executable code required to decrypt the encrypted code required to play those streams, the keys to be used along with the decryption code, etc., etc. The digital nature of these data is all that is important to the protocol. Thus, since the nature and/or use of the digital data are of no concern to the security protocol, the protocol is capable of protecting itself.

This capability means that the security protocol can be updated (to fix recently discovered security holes, for example) without requiring any changes to the hardware on which it is running, even during execution. The "older" security system is "subsumed" as a part of the newer security system (i.e., you never have to strip the old protection "wrapper" away in order to add a new, potentially more secure level of protection to the entire system). Thus, the entire system is encapsulated in the latest, most secure encryption and/or access control system. Not only may new keys be added, but entirely new security and/or encryption algorithms can be added on top of existing systems as well.

This flexibility allows the protocol to support a number of business models, including Time-limited Rental, Pay-per-View, Multiple Versioning, Machine-dependent License Revocation and Permanent Transfer of Ownership from one user to another.

Though a copyrighted software application is utilized in an exemplary embodiment, it will be understood by those skilled in the art that the same methods and systems can be used to provide security to any bit stream whatsoever, including text, video and audio data, source and object code, etc.

The basic functions which embodiments of the security protocol are designed to provide include (but are not limited to) the following:

Fair Use ("Time shifting", "Space Shifting" and archival backups)
    Incremental Upgrades
    Temporary Transfer of Ownership
    Permanent Transfer of Ownership
    Time-Limited Access
    Usage-limited Access (Number of Times used)
    Device-specific License Revocation
    Data or Stream-specific License Revocation For many security systems, one of the primary mechanisms for protection of the intellectual property contained in a copyrighted work is simple access control. However, if such a mechanism is ever bypassed, then the protection afforded by even the most sophisticated access control mechanism is of very little value. This is not to say that access control is a useless mechanism, but simply that it is not a total security system in and of itself. The fact that a number of copyrighted media streams are freely available for public consumption on the Internet is testimony to the fact that such security systems can almost always be bypassed. This kind of access control also makes it more difficult to establish a mechanism to make backup copies of legally purchased copyrighted works, which is a necessity if the original is ever in danger of being destroyed. Thus, the security protocol described herein does not require any sort of access control system in order to make it useful.

The security protocols described concentrate on controlling the expression of the copyrighted work, not on the digital data that make up the work itself. As such, the protocol makes no distinction between digital data that is used to encapsulate a copyrighted work or other digital data that is used to describe how that work is to be interpreted. As a result, the protocol can even be used to encapsulate other security protocols.

Basic Operational Description:

Embodiments of the security protocol are designed to enable the author of a piece of software to have a high degree of confidence that their code is protected from disassembly by those who would like to copy or otherwise misappropriate its algorithm. They are also designed to protect this code from modification by those who would attempt to alter its functionality. One of the methods by which these primary characteristics can be implemented in an otherwise general purpose computing system is discussed in a following section. An additional property, which occurs as a byproduct of these two primary functions, is the ability to control the conditions under which the software can be run (i.e., when and how and on which machine or machines the code is allowed to be executed). The first of these functions may be accomplished by adding a tamper-resistant timer element to the system. Others are accomplished by means of implementing a secure data structure, which is used to indicate the desired conditions, which must be met in order to execute the code block in question. Since this data structure is not hardware specific, it can be used in a variety of ways and is able to be modified by updating the software that is used to interpret it. Hardware specific features utilized to implement the protocol more efficiently are discussed, and examples of how these features can be put to use in order to support the protocol are given. Finally, we will show how the protocol can be used to protect a copyrighted work.

Embodiments of the security protocol depend on the ability to encrypt a digital bitstream in such a way as to only allow it to be decrypted by its intended recipient. This is a well-understood problem and is the basis of a large number of industry-standard encryption algorithms. However, there are two additional factors which should be considered for use with embodiments of the security protocol: the fact that it is helpful if the core of the protocol is able to be fit in the (relatively) small confines of a typical on-chip Instruction Cache (I-Cache) and the fact that it be capable of running in a semi-autonomous manner. In other words, it is useful if the protocol is small and does not require the use of a central security server for normal day-to-day operation.

Hardware:

Turning now to FIG. 1, an example overall block diagram of a device that is capable of executing this security protocol is shown. Elements of the security protocol system may include a set of hardware blocks, which implement the protocol in a secure manner on a protocol engine (also known as a "target unit") 100. These blocks are not required to be cast in hardware in order for the protocol to operate correctly, however, a device that includes all of the hardware elements described below will be capable of implementing the protocol with a minimum of overhead.

The first of these hardware blocks is a real-time clock 102. This is a free-running timer that is capable of being set or reset by a secure interaction with a central server. Although this is not a completely essential block, since the time may be established by conducting a query of a secure time standard, it would be more convenient to have this function be on-chip. This has to do with time-dependent software licenses and examples of such will be given in a later section of this document.

Another hardware element is a block of memory 110 where code that is to be executed can be stored on-chip. This is typically known as an Instruction Cache (I-cache), but in some embodiments an important characteristic of portions of this I-Cache 110 is that the data contained within certain blocks be readable only by CPU execution unit 120. In other words, this particular block of I-Cache memory 130 is execute-only and may not be read from nor written to by any software. We will refer to this special section of I-Cache as the "secured code block" 130. The manner by which code to be executed is actually deposited in this secured I-Cache block 130 may be by way of another hardware elements.

Additionally, there are other categories of possible "enhancements", which can be used to accelerate the operation of a secure code block. One of these is the ability to designate a (sub)set of CPU registers 140 which are either only accessible while the CPU 120 is executing secure code and/or which are cleared upon completion of execution of the secure code block (or if, for some reason the execution unit jumps to any section of code which is located in the non-secure or "normal" I-Cache). Even though there may seem to be no possibility of the CPU 120 executing a mixture of "secured" code and "unsecured code", one must always consider what can happen in the process of switching contexts when jumping into interrupt routines, and where the CPU 120 context is stored (most CPU's store the context in main memory, where it is potentially subject to discovery at a later point by an unsecured code block).

Another possibility (other than requiring the author of the secured code block to explicitly identify which registers 140 are to be cleared) is to have it done automatically. This would be where the CPU execution unit 120 keeps track of which registers 140 are read from or written to while executing inside a secured code block and then automatically clears them upon exiting the "secure" mode. This allows the secured code to quickly "clean-up" after itself such that only those data that are permitted to be shared between the two kinds of code blocks are kept intact. The "automatic" process may potentially be more secure than the "explicit" procedure, but it may make more complicated the case where the code author wishes to share information between secured and non-secured code blocks.

Another potential manner for dealing with the "leaking" of register-stored data between secure and non-secure code segments is to identify a unique set of registers which are to be used only when the CPU 120 is executing secured code. For some CPU architectures with large general purpose register sets 140, this might at first seem prohibitively expensive. However, the same effect could be accomplished without requiring an inordinate amount of overhead (i.e., without the silicon overhead involved in implementing a physically distinct set of "secure" registers) by using a modified version of the register renaming and scoreboarding mechanism, which is practiced in many contemporary CPU designs. If we treat the execution of a secured code block as an atomic action (i.e., it is non-interruptible), then these issues are easier to deal with, but this convenience may come at the price of performance and potential overall code complexity. Note that the "secured" portion of the I-Cache 130 does not necessarily require a different data path to the CPU as the "normal" portion of the I-Cache 150. In fact, the two can be completely synonymous.

A One-Way Hash Function block 160 is also depicted. It is possible to construct an engine that will be able to execute embodiments of the security protocol without having to implement this functionality in hardware. However, a hardware accelerator for certain parts of the hashing algorithm is certainly a desirable feature. Tradeoffs between hardware and software implementations of this functional block are discussed later.

Another portion of the target unit 100 may be a hardware-assisted decryption system 170, which uses the target unit's 100 secret keys and public/private keys (described later) to operate on encrypted messages in order to translate them into executable code blocks. This decryption system 170 can be implemented in a number of ways. The speed and the security of the entire protocol may be dependent on the construction of this block, so it should be both flexible enough to accommodate security system updates as well as fast enough to allow the system to perform real-time decryption of time-critical messages.

Keeping those two constraints in mind, it is not material to the protocol exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented.

Also note that there is an on-chip Random Number Generator 180 shown in the block diagram in dotted lines. This block is optional. Additionally, it can be replaced by a suitable off-chip method of producing a sequence of sufficiently random numbers, which can then be used to supply seed values for a software-based pseudo-random number generation system. This pseudo-random number generator can also potentially be implemented in hardware or in "secure" software. Of course, the same principle trade-off between the flexibility of a software-based system versus a hardware implementation applies in this case as well. However, since the case where the target device 100 must generate a random number is not a frequent occurrence in this protocol, it is not likely to have an impact on overall performance if this particular function is not hardware-accelerated.

Secret Key:

Each protocol engine ("target" unit) 100 may have two sets of secret key constants 104 that are stored on-chip; the values of neither of which are software-readable. The first of these keys (the primary secret key) can actually be organized as a set of secret keys, of which only one is readable at any particular time. If the "ownership" of a unit is changed (e.g., the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). The only other place where this primary secret key value (or set of values) is stored is on a central server at a licensing authority.

The primary secret key may be associated with a particular target unit's 100 serial number 106 in the central server's database. The serial number 106 can be stored anywhere on the target device 100, may be software accessible and has no other relationship to the primary secret key. Any updates to the operational aspects of the unit (such as updating the security system) may be accomplished by using the primary secret key. If the value of this key is not known by any parties other than the target unit 100 and the licensing authority, it cannot be used for any secure transactions that do not involve a link through a secure central server. However, since the security of this primary key is of paramount importance, it should be used only when absolutely necessary. Thus, it probably should not be used, for example, to encrypt the communications link for secure transactions between the central licensing authority's server and the target unit. This link can be secured using a standard key exchange protocol using a temporary key, which is generated on the fly, in accordance with currently accepted standard practice.

The secondary secret key may be known only to the target unit 100 itself (and thus, not to the licensing authority). Since the CPU 120 of the target unit 100 cannot ever access the values of either the primary or the secondary secret keys, in some sense, the target unit 100 does not even "know" its own secret keys 104. These keys are only stored and used within the security block of the target unit's 100 CPU 120. It is the combination of both of these secret keys that enhances the overall security of the target unit. We will describe how they are used later on.

Yet another set of keys may operate as part of a temporary public/private key system (also known as an asymmetric key system or a PKI system). The keys in this pair are generated on the fly and are used for establishing a secure communications link between similar units, without the intervention of a central server. As the security of such a system is typically lower than that of an equivalent key length symmetric key encryption system, these keys must be larger in size than those of the set of secret keys mentioned above. These keys may be used in conjunction with the value that is present in the on-chip timer block in order to guard against "replay attacks", among other things. Since these keys are generated on the fly, the manner by which they are generated in dependent on some sort of a random number generation system 180. Finally, it should be noted that care must be taken to ensure that the generated keys should not be contained in the class of so-called "weak" keys. The specific set of keys that are considered "weak" are dependent on the specific encryption algorithm used.

Operational Details:

The manner in which embodiments of the security protocol operate can be broken down into several discrete processes:

System Initialization, Secure Code Generation and Mass Distribution, Secure Code Loading and Execution, Key list data structure Construction, Temporary License Transfer, Permanent License Transfer, System Ownership Transfer, License Revocation and Security System Updates. Each of these is discussed in turn. It should be noted, however, that the examples described below are chosen for the purposes of simplicity of discussion and are not necessarily the most efficient (nor are they the only) manner in which this protocol can be implemented.

System Initialization

This is the step in which the target unit's secret keys 104 are set to some initial value. This procedure can be accomplished in one of several locations (for either of the two secret keys, but for logistical reasons, it should be the final step in the assembly process where either the serial number or the secret key can possibly be changed. In the case where the unit's 100 serial number is stored off-chip, then this procedure is most likely performed at the point of final assembly. If the serial number 106 for the unit is stored on-chip, then it would be most practical to carry out this procedure at the last point in the chip manufacturing process (i.e., after the chip has been packaged), so that any post-production or burn-in fall out has had a chance to winnow out the non-functional parts. This way, the amount of data that must be kept secure is minimized. Since the security of the entire protocol may be based on that of the unit's secret keys 104, the initialization procedure should be undertaken at a point where physical security is possible.

The primary secret key should be initialized (or "burned" into the device) in a different procedure than the one that is used to supply the secondary secret key. Although, in practice, this secondary key will be known at some point (since it is programmed into the unit at some point during the manufacturing process), the unit with which it is associated should not be recorded anywhere once it is stored on the target device 100. For auditing purposes, it may potentially be desirable for the total set of secondary secret key values to be examined independent of knowing which parts hold which keys (to test for randomness of the distribution, or for some other reason). In order to maintain the secure nature of the system, however, it is desirable that the device which programs this second secret key into the unit never have any means of associating the secondary secret key to either the first secret key or to the target device serial number 106. Also, both of these secret keys should be implemented in a tamper-proof manner, for reasons, which are described later. It is not material in which order these two secret keys are initialized. Following the initialization procedure described in the exemplary embodiment, the only location (other than on the actual chip) where the target devices' serial number 106 and their associated primary secret keys are co-located should be on the secure server at the licensing authority.

Secure Code Generation and Mass Distribution

Figure 5:
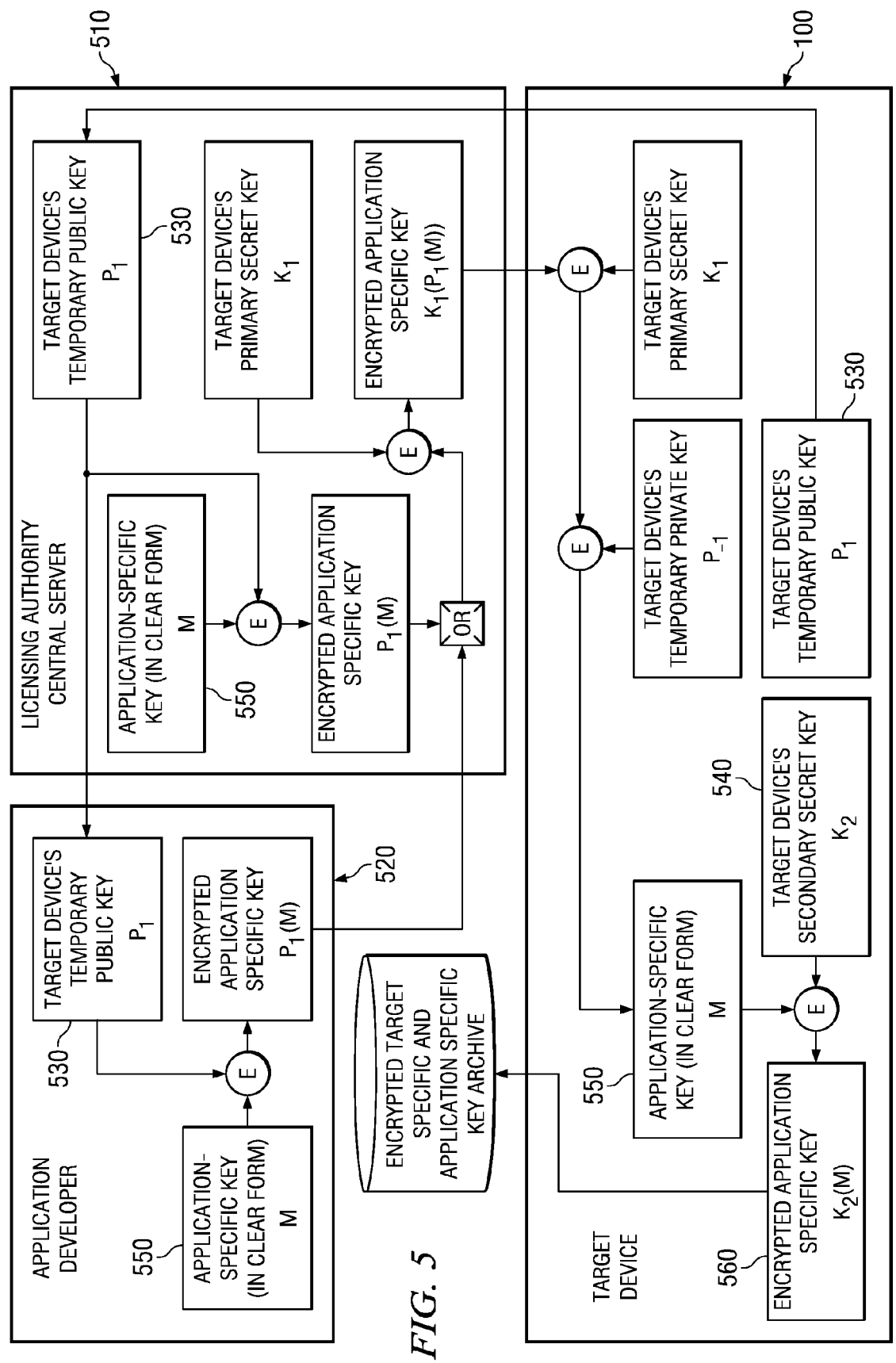
FIG. 5 is a diagram of one embodiment of the encryption/decryption process of a security protocol.

Referring briefly to FIG. 5, in an example scenario, let us suppose that a developer 520 wishes to produce an application to run under this protocol, which will be reasonably immune from disassembly and can only be executed on a specific device. Each registered developer 520 has a public key/private key pair which is used to authenticate any messages which they use to communicate with the licensing authority's server as well as to create signed Message Authentication Codes or MACs (typically referred to as digital signatures) which can be used to authenticate any published code block or other bitstream.

After an application is debugged, it is encoded using an application-specific encryption algorithm and key(s), which are known only to the original developer. This application-specific algorithm and key(s) can either be a symmetric (secret) key system or an asymmetric (PKI) key-based system. Attached to the end of the encrypted block of code is a MAC, which is then signed by the developer 520 using the private key of their published public key/private key pair (which thus forms an unambiguous digital signature for the encrypted code block). Either the digital signature or the original MAC and the corresponding Code specific ID number may be supplied to the licensing authority. The application developer 520 may also choose to supply the appropriate decoding key(s) as well (we will discuss the tradeoffs of this decision in a later section of this document).

Note that if the application-specific algorithm is an asymmetric encryption system, it does not necessarily need to be encrypted using the same published PKI key pair that is used to generate the signed Message Authentication Code (the digital signature). However, the MAC that is stored at the end of the code block should be generated using a known hashing algorithm and must also be signed using one of the developer's published public keys (thus forming the digital signature). This allows the target to verify the authenticity of the MAC using a known hashing function and a known public key.

Figure 2:
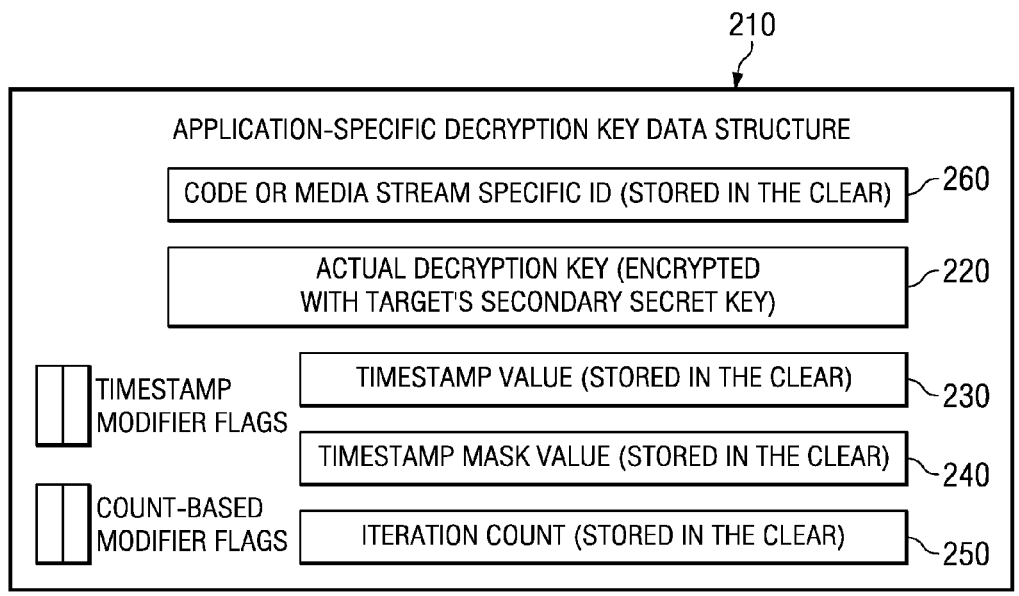
FIG. 2 is a representation of an embodiment of a decryption key data structure.

Moving now to FIG. 2, all application-specific encryption key data structures 210 may contain a number of extra fields (in addition to the decryption key itself 220). One of these fields may comprise a timestamp 230 and an associated mask value 240. The second may contain a "countdown value" 250. The mask value 240 is used in conjunction with the other two fields 230, 250 in order to determine when the key is valid. It should also be noted that it is not relevant to the protocol exactly how many bits are allocated to each of the fields.

Note that the timestamp value 230 can be used in several ways, depending on the bit pattern that is stored in the timestamp mask 240 field. The timestamp mask 240 value allows the developer 520 to select some subset of the timestamp figure that is ignored when performing the comparison with the target unit's 100 current time. As an example, however, if we assume that the smallest resolution which is supported by the timestamp field 230 is one second, then by masking out the lower five bits of the timestamp data 230, a particular key data structure 210 can be generated which is only valid when used over the course of approximately 32 seconds starting at the time which is stored in the timestamp field 230. The overall functionality of the security protocol is not dependent on the actual resolution of the lowest order bit of the timestamp field 230.

There may be other bits that are associated with the mask field 240, some of which can be used to indicate whether the key is valid before or after the value specified in the timestamp 230. Yet another mask field 240 bit can be used to indicate how the timestamp 230 and the "count-down" values 250 are associated. For example, this would be useful in the case where the intent of the application developer 520 was to limit the use of the software to a certain number of iterations either prior to or after a certain date, rather than simply tied to a certain date and time window. Of course, any combination of these conditions can be constructed, so the protocol is quite flexible in this regard. In addition, further flags can be included in this data structure to indicate other properties, such as how many legal copies of the keys may be simultaneously distributed from the original target unit 100 to others. This would be useful in the case where a multiple-copy license were desired, such as is seen in a digital library, for example.

Figure 3:
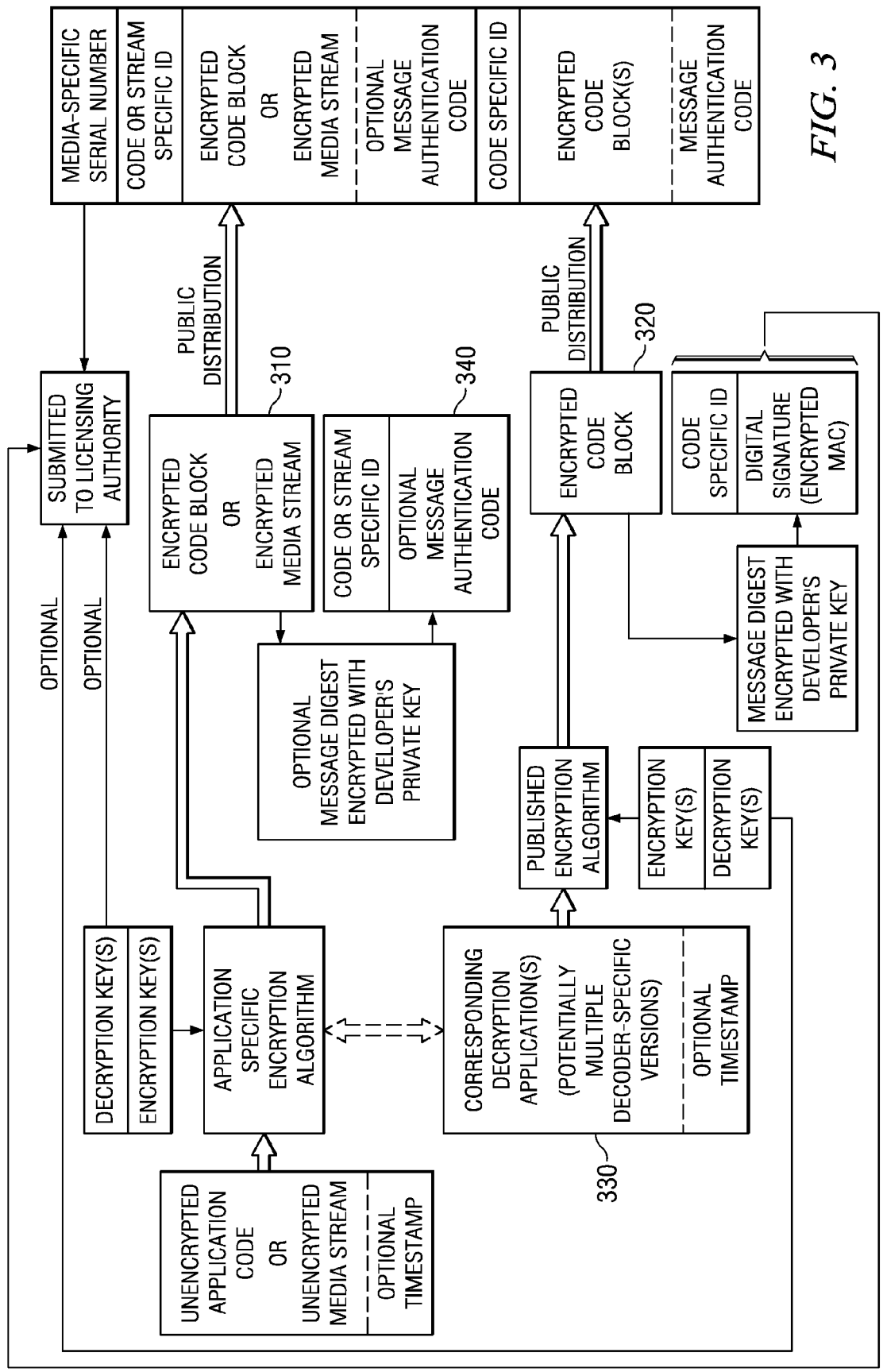
FIG. 3 is a diagram for an embodiment of the encryption and distribution process of a security protocol.

A flow diagram representing one embodiment of the encryption process can be seen in FIG. 3. Note that there is no substantive difference between the process that would be used to distribute a digital media stream or a software application (such as the decryption instructions used to interpret that media stream). In either case, there are a couple of different options for distributing the encrypted code block(s) 310, 320; either via an online server or on serialized discs (such as a standard DVD). In the latter case, the developer 520 can then choose to pre-register the individual serial numbers of the mass-produced discs with the licensing authority 510 (or not). If so, the serial numbers could be permanently affixed to the discs either by burning them into the Burst Cutting Area (in the case of a DVD) or by ink-jet imprinting in the case of a standard CD. Note that the developer 520 cannot embed these serial numbers into the data area of the CD or DVD, since the same serial number would be replicated on all of the mass-produced discs. If some sort of a hybrid format were used, where part of the disc could be mass-produced and another portion written once, then this would be another potential method of distributing the discs with individual serial numbers. In any case, a machine-readable serial number is certainly preferable, since it is less prone to errors during the registration process.

If the developer 520 chooses not to register the media serial number with the licensing authority, then there may be some other manner by which the proper encryption key(s) can be associated with the application or media stream files. Thus, the application developer 520 may either register the code-specific ID or an associated media serial number. In the former case, then the application can be distributed freely (i.e., not tied to a specific release format and media).

In the case of the individual serial number mechanism, the privacy of the end user is maintained, since the licensing authority 510 has no need to know (and potentially no indication of) which application (or media stream) is associated with which serial number(s). In the case where the developer 520 registers an application ID (or a media stream ID) along with its associated key(s), then it is possible for the licensing authority 510 to know which application(s) or media streams are "owned" by a particular end user. On the other hand, this potential lack of privacy is counterbalanced by the additional convenience and cost savings of not requiring the developer 520 to manufacture and distribute physical media. Note that the term "physical media" does not necessarily mean a disc. This function could be accomplished just as well by using a printed manual (or even a simple registration form) with an individual serial number sticker attached to it. All that is required is that the developer 520 must produce some object with a unique serial number, which is supplied to the end user. The purpose of this serial number is to act as a bitstream registration number. We will discuss how this serial number is used in the protocol in a following section.

For the example shown in FIG. 3, both the encrypted software application (or media stream) 310 and the machine dependent decryption software 330 are distributed using the same mechanism. It is not a requirement of the protocol that this should be the case and either or both of the encrypted code blocks 310, 330 can be distributed on-line or by pressing a disc. It should be noted, however, that in the case of a digital media stream, the media stream itself is most likely the larger of the two blocks 310, 330 by several orders of magnitude. Thus, in that case, it makes the most sense to effect the distribution of at least this block in a mass-produced disc format. In many cases, there may be enough room on such a disc to fit the companion encrypted code block (the one which contains the instructions of how to decode the first block) as well as the primary encrypted code block. It should also be noted that neither of the two data sets would be likely to undergo any changes after publication, so there is no fundamental requirement that they must be distributed online. As such, they are both well-suited to a mass-produced disc based distribution mechanism. Having both of them on the same disc also makes it easier to associate one with the other in an unambiguous fashion.

Secure Code Loading and Execution

Figure 4:
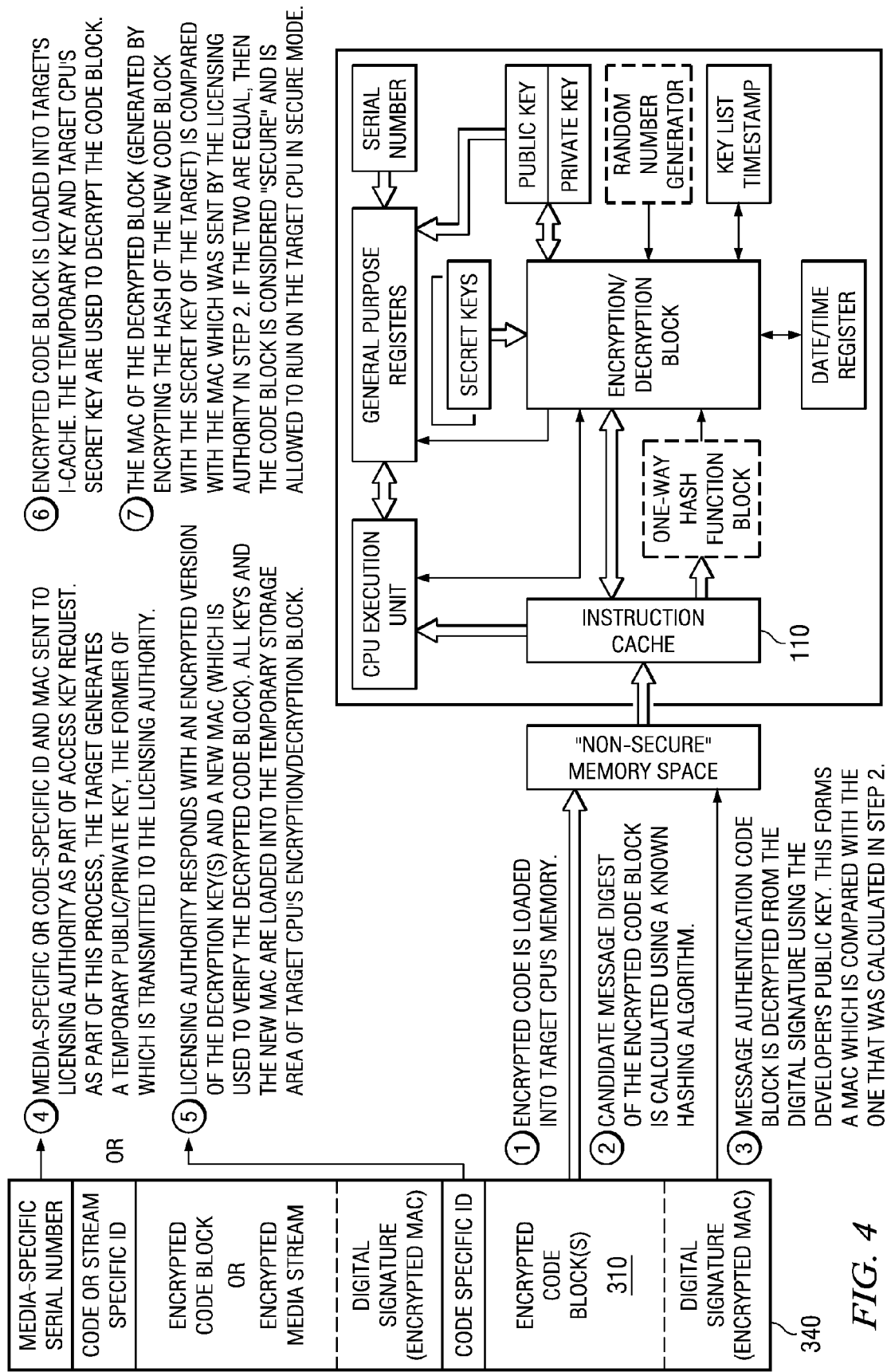
FIG. 4 is a diagram of the decryption and loading process for an embodiment of a security protocol.

In the case where the distribution mechanism is accomplished via an actual disc, the consumer can purchase the disc containing the application in exactly the same manner as a traditional software purchase. Of course, the end-user would not be able to run the encrypted code block unmodified on the processor of the "target" unit. When the user attempts to run the application on their machine, the CPU 120 loads the encrypted software block and uses the digital signature (the "signed" MAC) stored at the end of the code block along with the software developer's public key to verify that the code block in question is genuine. This is where the first hardware modification to an otherwise general purpose CPU 120 may come into play. The process for loading and decrypting such a block of secured code is shown in FIG. 4.

In order to make sure that the hashing function is computed correctly (and furthermore, that the comparison between the generated message digest and the "real" message digest is valid), the CPU 120 must perform this hashing function in a secure manner. Thus, the hashing function must either be generated directly by the hardware of the decoder unit or the hashing function itself must be computed using a block of "secure" code, the operation of which cannot be tampered with by an otherwise "non-secure" program.

Note that in the software-based hash case, this block of secure code should be considered as a part of the unit's 100 security system and, as such, may only be able to be downloaded to the player via a secure transaction between the unit 100 and the licensing authority 510. Interestingly enough, the establishment of a "secure" hashing function can be accomplished via the same secure protocols described herein. This recursive behavior for all aspects of the security system is what enables a software-based version of this protocol to be extremely flexible (and thus, updateable) in its encryption/decryption architecture.

If the message digest calculation is fixed in hardware, we can potentially gain some degree of security, but this comes at the expense of flexibility. If a dedicated hardware block is used to generate the hash value, and then some weakness in the hashing algorithm is discovered at some point after the chip is manufactured (or if there is some bug in its implementation), then there is no opportunity to address the problem after the fact. That is not to say that we cannot use some kind of hardware acceleration of the software-based hashing function (such as a programmable S-Box structure) in order to speed up the process. However, in that case, the hardware should ideally be sufficiently general purpose to support a large variety of one-way hashing functions.

It should be noted, however, that the security of this protocol is ultimately dependent on the lowest-level function that is provided as a part of this secure code loading procedure. The low level features (such as a secret key or a primitive operation which is used in a hashing function) are combined together in different ways to produce higher level functionality, such as a signed message digest. In turn, these higher level functional blocks are used to provide even higher level utilities, such as identity verification. This process of building higher-level functions on top of more primitive layers is known as building a "Chain of Trust". The flexibility of the system lies in placing the point at which the security related functions can be modified as low as possible within this hierarchy. However, at some point, the fundamental primitive operation(s) upon which this chain is based must be atomic in nature (i.e., this is the minimum level of functionality which must be implemented in hardware). The exact choice of this point of hardware granularity is, for the most part, an implementation detail, and the overall operation of this protocol is not dependent on this aspect, given the conditions above.

Once the encrypted code block 310 is loaded into the target's memory space 110, and the message digest is calculated, the result is then compared with a message digest which is calculated by decrypting the digital signature 340 which was stored along with the encrypted code 310 with the developer's public key. If the two are a match, then the target unit 100 can be certain that the encrypted code block 310 is genuine (or at least that the code was distributed by the developer 520 whose public key was used to decrypt the digital signature).

At this point, the target 100 then sends a secure message to the licensing authority 510 requesting a copy of the decryption key(s), which will be used in concert with the recently verified encrypted code block. As a part of setting up the secure connection with the licensing authority, the target unit 100 generates a temporary public/private key pair (the public portion of which is supplied to the licensing authority 510 server). The details of the key exchange procedure are well known and we need not go into the exact mechanism by which this is accomplished in this discussion. In any case, it should be noted that the overall network traffic between the target unit 100 and the central server at the licensing authority 510 is limited to a reasonably small data set, since it consists of a couple of key transfers, the code-specific ID and the MAC which was stored along with it.

Assuming that the code-specific ID 260 is one that the licensing authority 510 recognizes, there may be two possible courses of action, depending on whether or not the application author has already provided the licensing authority 510 with a "clear" copy of the requested decryption key(s). In the case where the developer 520 has not provided the licensing authority 510 with such information, then the central server transmits a copy of the target device's temporary public key (as well as the code-specific ID 260 in question) to the application developer's server. At that point, the developer's server responds to the licensing authority 510 server with a message containing the requested decryption key(s) (encrypted with the target's temporary public key) and a message digest generated from the properly decrypted code. In this manner, only the target device 100 can decrypt the message to obtain the application-specific decryption key(s) and the licensing authority 510 will not ever have access to the decryption key(s) in clear form.

Although the message digest can be pre-computed and stored on the licensing authority's server, the fact that it may be provided by the developer 520 during the transaction is of potential use if the hashing function (which is used to generate the message digest) should ever change. If this should happen, the developer 520 would need to provide updated versions of the decrypted code message digests to the licensing authority 510 either prior to or during the actual transaction with the target device 100. The developer 520 must provide this information since the licensing authority 510 should never have access to the original (decrypted) code. As before, the amount of network traffic between the licensing authority's server and the developer's server is still quite small. The encrypted key that was received from the developer 520 is then encrypted yet again with the target device's primary secret key prior to transmission from the licensing authority 510 to the target. This second encryption could actually be carried out on the developer's side as a part of the other transaction, but in that case, the developer would potentially have access to the target unit's primary key (unless both keys were somehow combined), which would pose potential loss of privacy issues for the end user.

Note that in the case where the application developer 520 wishes to stay "out of the loop" for transactions between the licensing authority 510 and the target device 100, they can simply provide the licensing authority 510 with a copy of the relevant decryption key(s) in clear (unencrypted) form and the associated MAC for the decrypted code block (the value of which must be updated each time the hashing algorithm is changed). Thus, the central server at the licensing authority 510 would be able to act autonomously and would not be required to establish a communications link to the developer's server in order to fulfill a key request from a target unit 100. However, this poses a potential security risk to the developer, should this "clear key" information ever be compromised, either intentionally or unintentionally by the Licensing Authority.

The flow diagram for the whole key encryption/decryption process is outlined in FIG. 5. In this case, the clear key would still be encrypted prior to transmission (as above) with both the target device's temporary public key and then again with the target's primary secret key. At this point, the target device 100 has the proper decryption key in a doubly encrypted format. In the case where the licensing authority 510 does not have access to the application specific key 550 information in the clear, then it should not be possible for anyone other than the intended target device 100 to be able to reproduce this key data in clear form, since the secret key for each unit 100 should only be known to the licensing authority 510, and the private key for the transmission is known only by the target 100.

At this point, however, the encoded decryption key(s) which the target 100 receives from the application developer 520 cannot yet be stored safely in the open at the target 100 (e.g. in a flash ROM or backed up on a hard drive). The problem is that the target device 100 would also have to store a copy of the temporary private key along with the encoded decryption key(s), which were transmitted from the licensing authority 510. If someone at the licensing authority 510 were to then gain access to these two pieces of data by some means, then they would potentially be able to reconstruct the decrypted application specific key 550 (given that they might have access to the target device's 100 primary secret key as well).

This is the point where the target device's secondary secret key comes into use. Recall that this secondary secret key is not known to anyone other than the decryption unit of the target unit. Thus, once the temporary private key is used to decrypt the key, which was supplied to the target 100 from the licensing authority, the secondary secret key is used to re-encrypt the application-specific key prior to its use (and/or archival).

The target can then use the application specific (clear) key 550 in order to decrypt the code block (or media stream). Thus, the only two places where the application code exists in clear form are at the original developer 520 itself and inside the "secured" portion of the target device's I-Cache 110 (where it can only be executed and can never written back out to memory in clear form). This allows privacy between the user and the licensing authority 510. In other words, the licensing authority 510 does not have to know what it is that the user has a license to (an enormous privacy issue), but it is still able to act as a repository (or backup) for the user's key list in the case where their unit 100 is damaged or stolen or otherwise rendered inoperable.

As a check to verify that the decryption process has been performed correctly, the message digest of the properly decrypted code is then compared with the message digest generated by decrypting the digital signature, which was forwarded from the original developer 520 through the licensing authority 510 to the target unit 100. As was mentioned earlier, this digital signature is created by encrypting the message digest of the unencrypted code block with the application developer's private key. Alternately, this digital signature can also be encrypted again by the developer 520 using another temporary public key 530, which was supplied to the licensing authority 510 when the connection was established. In any case, the correct message digest can then be decoded by the target device 100 by decrypting the digital signature with the developer's public key. If this message digest matches the MAC of the decrypted code block, then the code is considered to be genuine and it is allowed to run on the target 100. This message digest may then be re-encrypted with the target unit's secondary key 540 for archival along with the re-encrypted application specific key 550.

The final step in this procedure is that the newly encrypted (with the target device's secondary key 540) version of the application specific key 560 is retransmitted back to the licensing authority 510 server for archival purposes. This transmission serves a few purposes. First, it is an acknowledgement that the target device 100 was able to properly decrypt the code block. Second, it is necessary for the licensing authority 510 to have a copy of this encrypted key 560 in order to deal with the case where the end user suffers some sort of catastrophic data failure and they have neglected to make their own backup copy of their access keys. The licensing authority 510 can then act as a backup storage facility for any particular user. Yet another reason for this procedure is in order to deal with the case where a particular target device 100 changes ownership from one user to another or if the user wishes to upgrade their target device 100. This kind of permanent transfer of ownership can involve the transferal of all of the licensed application keys for that unit 100 (in which case, there is nothing which needs to be done other than re-registering the unit under the new owner's name). However, if the user wishes to transfer permanent ownership of their key data from the first to the second device, then this may be accomplished by means of a secure transaction between the licensing authority 510 and both of the target device.

Figure 6:
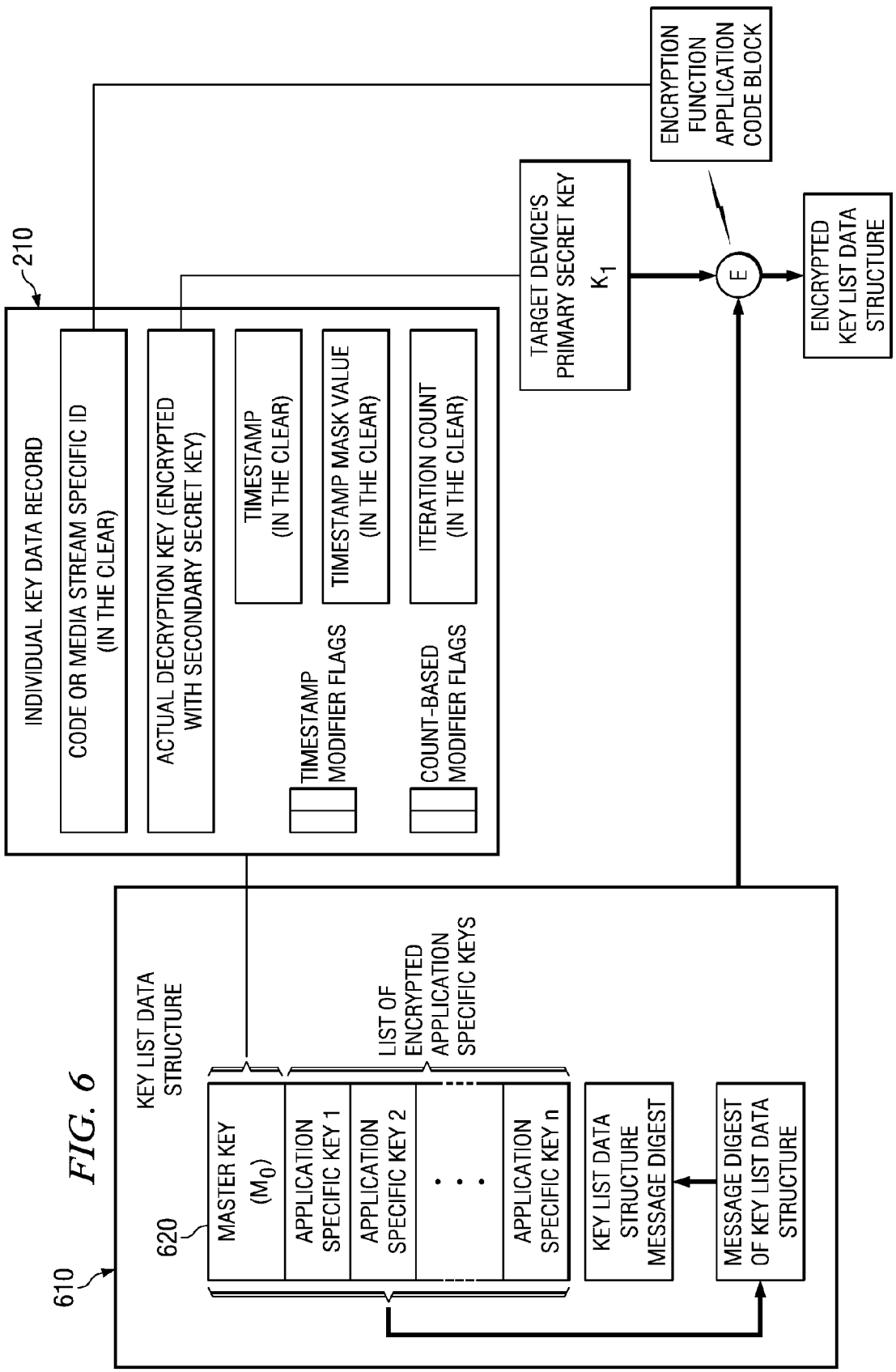
FIG. 6 is a representation of an embodiment of a key list data structure.

The other piece of information that the target device 100 transmits back to the licensing authority 510 server is the message digest of the target device's newly updated key list data structure 610 (as depicted in FIG. 6). This is both an acknowledgement of the newly updated key list data 610 structure and is also used to verify the equivalence of the key list data structure 610 associated with that particular target device 100 on the licensing authority 510 server and on the target device 100. The exact construction of this data structure will be described in the following section. We will also discuss methods by which permanent transfer of ownership of a particular key or set of keys is accomplished in a later section.

It should be noted at this point that the process outlined above is not the only manner in which the protocol can be used to transfer the application specific key 550 from the developer 520 to the target device 100. For example, the actual key transfer transaction can involve a direct connection only between the target 100 and the application developer 520. However, in that case, a connection must be established between the developer's server and the licensing authority's server in order to contribute the device specific encryption information to the transaction. There are a number of mechanisms by which this protocol can be made to work in a secure fashion, and the example discussed above is just one of these. However, the common thread is that all three parties must act together in order to ensure that the key data, which is transferred to the target 100, is only useable for that target device 100.

Note that the structure of a key can be set up to have two pieces: a hardware-specific part as well as an application-specific part. It is not a requirement that these two pieces be completely inseparable. If they are inseparable, then we get the properties exactly as discussed earlier. If, however, there is a way to make the key pieces independently operable, then we can enable a global set of copy and use restrictions that could be independent of the actual code or of the actual target device 100. In other words, any developer 520 could publish an application or media stream which had no restrictions on distribution, but which could not be read; only executed. This could be useful in the case where the licensing authority 510 wanted to send out a security system update that would run on all devices, regardless of the manufacturer. Another example of this would be the broadcast of a publicly available media stream while still maintaining control over the copyrights to that stream. Similarly, a publisher could distribute an application, which anyone could read and/or copy, but which would only execute on one specific target device 100 or set of devices. This could be useful for sending out an "update this specific class of device" message, for example. Another possible application is to send out an application, which would run everywhere and had no restrictions on distribution. This would be similar in nature to publishing the source code for a particular application (i.e. open source distribution). The different classes of security which are enabled by a separable H/W-specific and S/W-specific key structure are illustrated in Table 1.

TABLE 1

Separable hardware-specific and application-specific key structure

| | | Software or Application-Specific key segment | |
|---|---|---|---|
| | | "Locked" * | "Unlocked" ** |
| Hardware-Specific key segment | "Locked" * | Restricted operation as well as restricted distribution | Unrestricted distribution, but executable only on a designated unit (e.g. code targeted to a specific unit) |
| | "Unlocked" ** | Unrestricted distribution, but will execute only, i.e. the code is not "readable" | No Restriction on operation or on distribution (i.e. public and open) |

\* i.e., Locked to a specific serial number (or to a range of numbers)
\*\* i.e., will work anywhere Key List Data Structure Construction Looking now at FIG. 6, the data structure 610 containing the list of application or media-specific keys, which are licensed to a particular target device 100 is a valuable commodity and, as such, it should be able to be backed up by the owner. Since the individual keys are encrypted with the target's secondary secret key (as described above), the list is only useful to the unit to which the keys are licensed. However, we need to be able to make sure that this data structure 610 is secure from tampering, corruption and/or outright loss. In the case of a lost key list data structure, the entire data structure 610 can be recovered by requesting a new copy of the key list for that particular target device 100 from the licensing authority 510, as was described earlier. In the case where a temporary change has been made to the key list data structure (we will discuss the reason for such a scenario in the section following this one), then the protocol may accommodate a means for identifying such a change as being temporary. Finally, we include some tamper-resistant mechanism for validating the authenticity, timeliness, and validity of the key list data structure 610.

With these requirements in mind, we can construct a secure key list data structure 610 that exhibits all of these qualities in a manner like that which is shown in FIG. 6. As always, the example shown is not the only method by which all of the desired properties can be included in such a data structure. Nonetheless, the particular data structure illustrated in FIG. 6 does, in fact, fulfill all of the basic requirements of the protocol.

There are a few basic precepts that should be noted in the diagram above. The first is that the top-level encryption of the key list data structure 610 must be performed with the target device's primary secret key. There are a couple of reasons for using this particular key, but the main issue is that the licensing authority 510 must be able to regenerate the encrypted form of this data structure independently of the target device 100 in the case where the local copy of this data structure must be restored. If any other key is used to encrypt this data structure (such as the target's secondary secret key, for example), then when the target needs to make a change to the data structure (as is the case when a key is added to the list), the entire list must be transferred to the licensing authority 510 for backup purposes. This could potentially greatly increase the amount of network traffic that must be transmitted back to the licensing authority 510 and is not necessarily the most efficient use of the channel bandwidth.

Also, it is desirable that this key list data structure 610 be used for the storage of security system-related keys, in addition to being used for the storage of standard application or media stream specific license keys. Since this data structure is able to be regenerated by the licensing authority 510, in cases where it is desirable to update the security software which runs on the target device 100, it would be both more secure and more efficient (from the standpoint of code storage requirements on the target device 100) if the same key list data structure 610 could be used for both functions.

The second issue is that the encrypted version of the key list data structure 610 includes a message digest of the original key list data structure 610. It should be noted that although each of the individual keys are encrypted, other pieces of the list itself are not separately encrypted at the point when the message digest is calculated. Following the message digest calculation, the entire key list data structure 610 (including the message digest) is then encrypted with the key value and algorithm that are identified by the top-level (or master) key. This is done in order to prevent a malicious third party from tampering with the list, calculating a new message digest and then substituting the modified list for the genuine one. When the key list data structure 610 is read into the memory space of the target unit 100, this (decrypted) message digest is used to verify the authenticity and validity of the key list itself in the same manner as the way that a MAC is used for any other secure encrypted code block. The fact that all of the elements other than the individual keys are only encrypted with the master key means that the list can be traversed (and the list maintained) without having to have access to any keys other than the top-level key. Also, a key list inventory can be compiled with only a single pass through the decryption block.

A third principle which is of interest is that the individual application code or media stream specific keys can be made large enough to accommodate individualized keys for each target device 100. In the case where the code or the media stream is distributed by way of a mass-produced disc, this would mean that the application developer 520 would need to issue a new code-specific ID along with the individual decryption key(s). Although this may be less efficient from the standpoint of trying to minimize the amount of data which must be transferred between all of the parties involved in the licensing process, it does add functionality to the protocol, including (but not limited to) the ability to track compromised decryption keys. We will also discuss this in a later section dealing with key revocation.

The next issue of note is that the key list data structure 610 header shares the same set of characteristics as the application specific keys that make up the rest of the list. In fact, the header can be thought of as a master key 620 for the rest of the key list data structure 610 itself. Thus, the same principles of operation can be applied as far as how this key can be used to determine the management of the rest of the list. This includes time-dependent management of the security system of the target device 100. Thus, the target unit 100 can be forced to update its security system at pre-determined intervals, which is an extremely powerful concept all by itself.

The possibility also exists that the key list could contain a number of sections, each with its own master key 620 (list header) and thus with its own independent encryption mechanism. As with any other key, the list header contains a code specific ID field 260, which can point to an encrypted code block that is used to interpret the key list data structure 610. The whole list could then be contained within yet another master list, which includes its own master key (which is yet another list header). Thus, the entire key list data structure 610 can be recursively defined. As before, this recursive property can be used to update the security system by creating new key list data structures to address shortcomings of previous versions of the same data structure. Since the security of the whole list is contained within the "outermost" (or most recent) security layer, then the security of the entire key list data structure 610 is always based on the latest iteration of the security software.

Thus, the recursive property of the key list data structure 610 is a compelling feature. It is also the reason that the exact implementation of the data structure, which was discussed in an earlier section, is not of great significance. The description provided above was simply an example that included the features that are the minimal subset of functionality required to make the recursive nature of the protocol work.

Independently of how it is structured, the key list 610 may be maintained and/or updated under several common circumstances. These circumstances include (but are not limited to) the case where the status of one or more of the keys contained in the list is modified. There are a few basic mechanisms by which the ownership of a particular key 210 can be transferred from one unit to another and we will discuss these in later sections. In any case, however, the mechanism by which the revised key list is maintained can be split into two classes: those which require the intervention of the licensing authority 510 and those which can be carried out independently.

One of the primary operating concepts upon which this protocol is based is one of reducing to a minimum the amount of required network traffic between the central server of the licensing authority 510 and the individual target units. Thus, any temporary changes to the key list data structure 610 (the reasons for which we will describe below) should be able to be maintained independently by the target unit 100. The main reason for this is that these changes would ostensibly occur more frequently than permanent changes to the device's security system (which should always only be accomplished by an interaction between the target device 100 and the licensing authority).

In any case, there must be some mechanism by which the target device 100 can keep track of the current state of the master key list data structure in an unambiguous manner. This can be accomplished by having two "master" lists. The first of these two lists (which we will call the permanent key list) is maintained by the licensing authority 510. This list is concerned with the "permanent" ownership of the application specific keys that are associated with the target unit 100 in question. The second list is of equal importance, but it is that which is concerned with temporary modifications to the "permanent" key list data structure. Note that these modifications can either be additions to the list or they can be deletions from the list. There are no necessary differences in the implementation of the data structures of the two lists themselves; the main differences occur in how they are maintained. It is desirable that there should be some way for the target unit 100 to recover from the event where the data from one or the other of these lists is either lost. This loss can be due to some catastrophic failure or due to the case where the information contained within one of the lists is somehow corrupted (either innocently or maliciously). We will discuss the implications of such "key list corruption" events in a later section. Although it is necessary that the permanent list can be restored by a connection with the licensing authority, it is not necessary (or even desirable) for the licensing authority 510 to be able to recover a particular target device's temporary key list. There are many reasons for this position, but the main reason is that the temporary key list is most likely updated much more frequently than the permanent key list and we wish to keep the amount of required network traffic between the central licensing authority 510 and the target units to an absolute minimum. Nonetheless, it may be potentially desirable for the licensing authority 510 to be able to make modifications to a particular target's temporary key list for several reasons (some of which we will discuss later). In this case, it would be desirable to have this list encrypted using the target device's primary secret key (which is known to the licensing authority 510).

As mentioned earlier, the integrity of both of the key list data structures can be verified by using the signed message digest (the digital signature), which is stored along with the list itself. The implementation of the secure code mechanism, which is used to generate this message digest, was described in an earlier section and we do not need to go over the procedure again. We have also already described the procedure for recovering the permanent key list data structure 610 in the case of loss and/or corruption. The only remaining issues that must be addressed are how to interpret the time-dependent portion of the temporary key list data structure and how to deal with the case where a temporary key list is somehow rendered unusable.

Temporary License Transfer

This is one of the sections of the security protocol where the use of the timestamp field 230 is of prime importance. As discussed earlier, the temporary key list data structure is constructed in exactly the same manner as is the target device's permanent key list. However, there are a couple of differences between the two. The first difference is that the temporary key list can potentially be encrypted with either one of the target unit's secret keys 104. Since it is not necessary that the licensing authority 510 be able to reconstruct this data structure under normal circumstances, it is ostensibly not relevant which of the target unit's keys is used to encrypt it. However, it would potentially be of use to the licensing authority 510 if this list were also encrypted using the target unit's primary secret key. The reason for this has to do with license revocation and that situation will be discussed in a later section.

A second (and more important) distinction between the temporary and the permanent key lists is that a copy of the timestamp value 230 which is associated with the most recent temporary key list data structure is also stored inside the target device 100 (i.e. on-chip). This register is not software readable and is only able to be overwritten by secure code, as it is a part of the security block. The value in this register is used to determine what to do in the case where the temporary key list data structure is somehow lost and/or corrupted. We will discuss that procedure later on in this section.

Yet another distinction between a temporary key list and a permanent key list is that a target unit 100 is able to (temporarily) transfer ownership of a particular key from its permanent list to another unit's 100 temporary list, but no (correctly operating) device is able to transfer ownership of a particular key from its temporary key list to any other key list. This includes, of course, not only other units' temporary key lists, but also the target's 100 own permanent key list as well. This means that only the permanent owner can decide which devices are allowed (and when they are allowed to) "borrow" any particular key. Note, however, that this "loan" period can be made indefinite (and this transaction can be carried out without the necessity of contacting the licensing authority). This "permanent loan" feature is equivalent to the standard "Copy Once" functionality requirement that is part of most modern digital Copyright Control Information (CCI) systems.

Turning now to FIG. 7, a detailed flow diagram depicting the temporary "key checkout" procedure is shown. The "key ownership" transfer procedure is somewhat similar to the procedure of checking a copy of a book out from a library. When the "borrower 720" requests the temporary use of a particular application specific key 550 from the permanent owner (the "lender 710"), then the lender 710 first generates an updated temporary key list for itself which prohibits the use of that particular key for the duration of the key checkout negotiation process. This action prohibits more than one borrower 720 unit from requesting the same key. The presence of the "checked out key" on the temporary key list of the lender unit 710 is effectively used as a semaphore to control access to any particular key. However, the initial amount of time that the key is placed "on restriction" should be limited to a relatively short period. This is to prevent the case where a borrower 720 device requests access to a particular key for a long period of time and then is unable to complete the transaction for some reason from unfairly monopolizing the use of a particular key. This relatively short checkout negotiation phase timeout also helps in the battle against the malicious device, which may be attempting to mount the equivalent of a "denial of service" attack against the lender unit 710. In fact, the lender unit 710 can optionally ignore requests from devices which are not on its "approved borrower" list or if any one of those units should try to make too many requests within a certain time period. The exact length of time that this temporary block is placed on the key is not important, but it should be long enough to allow any given checkout procedure to go to completion. In times of high network traffic or latency, this period could be extended.

Note that in the case where more than one copy of a given key is allowed to be simultaneously checked out, the appropriate fields within the lender device's 710 temporary key list can be used to indicate how many copies of a given key are checked out at any one point in time. Once the borrower 720 and the lender 710 have negotiated a specific checkout period for a given key, then the lender 710 sends an encrypted copy of the key 740 to the borrower 720. This encryption is carried out using a temporary secret key 730, which is known only to the lender device 710. When the borrower 720 then acknowledges the accurate receipt of the encrypted key (by means of a message digest which is calculated from the encrypted message), then the lender 710 extends the "loan period" of the checked out key and then sends the temporary secret key 730 to the borrower device 720. The maximum duration of this loan process is not important to the operation of the protocol and there are some tradeoffs that must be made in the choice of this value. We will go over those particular issues later on in this section. In the example discussed above, we assume that the "borrower 720" and the "lender 710" devices are able to negotiate the actual length of the checkout period on a key-by-key basis, although this is certainly not a requirement of the protocol.

Just prior to the point where the temporary key list of either the borrower 720 or the lender 710 is updated, a copy of the timestamp value 230 associated with this new temporary list is stored in a non-volatile fashion on the target 100. At that point, an encrypted version of the temporary key list data structure can be safely written out to memory (or stored in some other, more permanent location, such as on-board NVRAM, Flash ROM or even out to a backup file on some hard disk 750. Since the temporary key list is potentially read from and updated on a much more frequent basis than the permanent key list, it is desirable that this list should be quickly accessible to the target unit, so it is recommended (although it is not an actual requirement of the protocol) that this list be stored in at least one location where the access latency is relatively short. On the other hand, it is recommended that the only place where this list is stored is some volatile storage medium (such as DRAM), since a power failure could potentially cause the loss of the unit's 100 functionality for an indeterminate amount of time. We will go into details about this issue later on in this section.

When the checkout period time for a particular key has expired, both the borrower 720 and the lender 710 devices can update their respective temporary key list databases independently. Thus, it is not a requirement that the borrower 720 be in contact with the lender 710 unit in order to "return a particular key to circulation". This is a major convenience factor in the case where the borrower 720 and the lender 710 devices are widely separated. Of course, the security of this operation may depend on a very tight correlation between the on-chip clocks that are used to generate and control the key timestamp records. Thus, the time/date clock must be an integral part of the security system and, as such, should be able to be overwritten by a transaction with the central server. Also, the clocks must be designed to be robust enough to resist tampering in the case where a malicious user tries to modify the internal timestamp value 230 and also to be able to survive normally occurring system power failures. Since it is not inconceivable that this clock is battery powered and that the battery could get removed or it could go dead over time, the system should be designed in such a way that the clock could potentially be restarted and reset by an interaction with the licensing authority.

Thus, we have described a situation where the ownership of a particular application specific key 550 can be temporarily transferred from one unit to another. At the end of the "loan period", both the "borrower 720" and the "lender 710" units can update their temporary key list data structures to reflect the "return" of the key to its original owner. Note that this procedure can be carried out independently on both units and thus does not require any interaction between the two devices.

We now must deal with the case where one or the other of the temporary key list data structures is corrupted and/or lost while one or more keys are "checked" out or "on loan". On the side of the "lender 710" unit, when any keys are checked out, the first thing that it does is to determine the end of the "loan" period. This value is obviously constructed by adding the duration of the loan period to the value of the current time/day field. This time/date value is then compared with the value that is stored on chip as a result of the last time the device's temporary key list was updated. If the new value is greater (later) than the old value, then the new value is overwritten in place of the old one. On the "borrower 720" side, this same process is used, so that the result is that in any given target unit, the temporary key list timestamp is always the latest of any of the timestamps which are stored as a part of that particular unit's 100 temporary key list.

If a unit's 100 temporary key list is lost or otherwise improperly modified, then both the temporary key list and the permanent list are disabled until the point where this "latest timestamp" value has expired (effectively, a "timeout" period). At that point, then the unit can go back to using the permanent key list and can begin the process of reconstructing a new temporary key list.

Thus, if a device's temporary list is ever tampered with or deleted, then the unit is effectively rendered inoperative until the timeout period has expired. While this timeout procedure may seem unnecessarily restrictive, it avoids the potential problem of multiple copies of any particular application specific keys ever existing as a result of some malicious act or because of some glitch (such as a power outage or a network connection going down) which may occur during the transfer of a key from one unit to another. Also, the potential for such severe repercussions as a result of tampering with the temporary key list data structure should help to discourage the practice by all but the more sophisticated attackers.

There are a number of optional additional features, which could be used to enhance the operation of the protocol in this regard. One such possible option is to add a signed message digest (digital signature) generated from either (or both) of the encrypted key list data structures to the values that are stored in the target units' on-chip security section. The MAC value resulting from the decryption of the digital signature could be used to quickly verify the validity of any particular key list without having to go through the entire decryption process. However, the issue of multiply nested key lists means that it is entirely likely that this decryption procedure must be performed multiple times at some point in order to finally produce an unencrypted key, so it is not critical to the operation of the protocol that these digital signatures be stored on-chip.

Another possibility for an enhancement is to store a pair of on-chip timestamp values rather than just one. The additional timestamp could be used to indicate the earliest (next) time when the temporary key list must be updated. This would make it easier for the target device 100 to decide when it needs to revise its temporary key list, since it would not have to constantly check over the list (which involves going through the decryption process). Although this feature would be very useful, again, it is not a fundamental requirement in order for a unit to be able to execute this protocol. If a system that contains this second timestamp is implemented, however, it does bring up a potential for confusion in the case where the two timestamps get "out of sync" for some reason. One such example, which comes to mind, is the case where there is a power glitch that occurs at the point immediately after one such timestamp is written, but before the second one is updated.

The final issue that should be addressed is the matter of what the minimum and maximum limits are for the values of these temporary key list timestamps. On one hand, a larger limit for the maximum "temporary loan period" could allow the user to transfer the use of a particular data application (or media stream) from one unit to another unit for a reasonably long period. This would potentially be of use in the case where a user wished to transfer ownership of a media stream from their "home unit" to a portable unit. Having a long "checkout period" would allow the user to take the portable unit with them (along with its associated temporary keys) on a lengthy trip without requiring that they be in contact with the original "lender" unit 710. The downside of a long "checkout" period is that if anything should ever happen to the temporary key list data structure on the original unit, then that unit would be potentially disabled for a long time.

This last issue also points out a potential danger for the target unit 100 in the case where a piece of malicious code is able to set the value of the on-chip timestamp register to some indeterminate value. This could potentially be tantamount to disabling the target of the attack, and thus, the value of this timestamp register should only be able to be written by a "secure" code block. Again, since each unit will have a distinct set of secret keys, the discovery of one particular unit's 100 secret key 104 data should not be a cause for concern for any other unit, except in the case where a malicious device is able to effectively masquerade as a legitimate unit. This mode of attack is discussed in a later section, which deals with issues related to Identity Verification.

Permanent License Transfer

Many of the elements of this procedure have been discussed in earlier sections of this document. The basic process by which a specific key is permanently transferred from one unit to another was shown earlier in FIG. 5. In many ways, this procedure is essentially similar to that of the temporary transfer of key ownership as described in the section immediately preceding this one.

The main differences between the two procedures are that the permanent transfer is a simpler process than the temporary transfer and that the permanent key ownership transfer procedure should utilize an interaction between the licensing authority 510 and the target unit 100. The reason that the permanent transfer process is simpler lies in the fact that it does not require the checkout time period negotiations that are prerequisites in the temporary key checkout procedure. The reason that the permanent transfer function utilizes an interaction between the licensing authority 510 and the target unit 100 is due to the fact that the updated key list data structure must be able to be reconstructed at both ends of the transaction.

Since a permanent license transfer usually occurs by means of an interaction with the licensing authority 510, there is a record of which application or media stream specific keys belong to which target units. As was described earlier, this is necessary in the case where the target unit's 100 key list must be restored after some catastrophic data loss situation or in the case where the ownership of a particular target unit 100 is transferred to a different entity. This intervention on the part of the licensing authority 510 is also necessary in the case where the permanent ownership of a specific key is transferred from one target unit 100 to another. This ability of the owner to re-sell an asset, which was originally purchased from another entity, is known as the "right of first sale" and the ability for the protocol described herein to support this particular functionality is of importance.

Another important aspect of the fact that the target unit's 100 permanent key list is maintained by the licensing authority 510 is that this body has the ability to revoke any or all of an individual target unit's 100 license keys in the event that it is proven that the unit 100 has somehow been compromised or if one of the keys has been identified as having been compromised. Since the potential exists to give a unique list of keys to each and every target unit 100 (as was described above), there could also provide an opportunity for the licensing authority 510 to track the source of any compromised keys. In such a situation, this protocol could fulfill the functionality that is normally associated with that of a "watermark" feature, but without the drawbacks of the traditional watermark process (such as the potential of the watermark to have an adverse effect on the quality of the media stream).

Even though it may not seem to be the case, the digital content owner's privacy is still maintained by this process, since the application code or media stream specific ID information originates with the application developer 520 and the licensing authority 510 does not necessarily have enough information to be able to make the association between any particular application or media stream and its licensed owner. This ability to protect the users' privacy is also an important aspect of this protocol.

The final issue that should be noted about the permanent key transfer process is that it is, in fact, possible to accomplish all of the same functions that the permanent key transfer performs with a temporary key license transfer. However, the maintenance of the target units' security system is a function which should ideally be controlled by a central secure server, so it is necessary to have such a mechanism in place somewhere in the chain. Also, in the case where the user is concerned about maintaining their privacy, the fact that the central server can act as a buffer between the copyright holder and the target unit 100 is of great utility. Finally, there is also the appeal that the licensing authority 510 is able to act as a central backup storage mechanism for a particular target unit's 100 permanent key list that sets this functionality aside from the temporary key transfer mechanism.

System Ownership Transfer, License Revocation and Security System Updates

There are several different means by which one or more of a target unit's 100 licenses (or keys) may be revoked. The simplest method is that of simply updating the target's 100 primary secret key. At this point, the target 100 would then be unable to access its permanent key list and thus, it would have to begin the process of creating a new one. Note that in the case where the primary secret key was not used in the encryption process for the temporary key list data structure, then this temporary key list could potentially still be accessed, even though the permanent key list might be otherwise inaccessible. This point was mentioned earlier in the description of the encryption process for the temporary key list. For this reason, it is probably the best idea to use the target unit's 100 primary secret key as the encryption key for both the permanent and the temporary key list data structures.

In the case where the ownership of the target unit 100 changes from one individual to another, then the simplest manner to effect this ownership change is to set the unit's 100 primary secret key to some new value. However, if this occurs before the original owner has the opportunity to recover all of their permanent keys from the target, then they will lose their licenses. In the case where the original owner wishes to transfer the ownership of the associated permanent key list along with the target unit, then nothing need be done to the target unit 100 except to change the ownership information that is associated with that particular device (which is stored at the licensing authority 510).

Another manner by which license revocation can occur is if the master key for a particular target unit's 100 permanent key list "expires". Since updates to the unit's 100 security system are stored as a part of the permanent key list, this situation could potentially have disastrous repercussions.

Although it would potentially be possible to recover from this predicament, it would require that the target 100 would need to have an entirely new "chain of trust", built from the ground up. In this situation, the core of the newly initialized security system would have to be based only on those computations that can be verified as being able to run atomically on some part of the target 100. Thus, this would preclude the use of any hashing function that required even the smallest amount of otherwise general-purpose code (which could potentially be suspect). Fortunately, this situation can be avoided by the simple matter of always keeping a permanent core of verifiably secure code fragments as a part of the permanent key list data structure which does not expire. This is, itself a security risk, however, for reasons discussed above, so the contents of this permanent code core should be limited as much as possible.

Yet another manner of license revocation can occur if the licensing authority 510 chooses to override a particular key entry in a target unit's 100 permanent or temporary key lists. This could be used in the case where if a security system upgrade is required or in the case where a particular target unit 100 has been identified as having an unlicensed copy of a particular application or media stream. Since the target unit 100 normally maintains its own key list data structure, this procedure will involve a larger than normal amount of network traffic between the licensing authority 510 and the target unit. Thus, this course of action should be reserved for extreme cases.

Nonetheless, such a procedure can be accomplished by forcing the target device 100 in question to revise its security system software with a target-specific custom version that is designed to search for and disable the disputed key and/or then replace the older software with an updated version. Of course, this procedure can only be set in motion at the point when the target device 100 initiates a connection with the licensing authority's central server. Under normal circumstances, it cannot be guaranteed that any particular target unit 100 will initiate contact with the licensing authority 510 on any particular schedule. Fortunately, the target device 100 in question must connect with the licensing authority 510 (either directly or indirectly) in order to authorize any new additions to its permanent key list, so any key revocation actions can be accomplished as a part of the new key licensing procedure. It is also possible that the "security system timeout" mechanism mentioned earlier could be used to support this "list policing" action. However, it is not a requirement for this protocol that this is the case and it is likely that such a system would result in an erosion of the users' privacy rights.

Other Concerns:

There are a number of issues, which are not necessarily part of the protocol itself, but nonetheless must be addressed in the process of creating a practical system that is able to properly execute the protocol described herein. Some of these issues are dependent on the implementation of the actual processor device and others are mostly specific to the application. Since this information is germane to the proper construction of a suitable target device 100, we will discuss some of these issues in the following section.

Limits on the Number of Units which can Interoperate

In the case where the copyright holder wishes to limit the total number of devices to which the primary target is able to temporarily transfer ownership, this may be accomplished by means of establishing a limited number of public/private key pairs that may be active at any one time. Note that this is different than the case where multiple copies of the same application specific key(s) were simultaneously "on loan", which was described in an earlier section. Other scenarios are possible, where the list of devices which are able to "check out" any of the application specific keys from a particular target device 100 can be limited to a certain set of serial numbers. The licensing authority 510 can administer such an "approved borrower" list in exactly the same manner that the target unit's 100 security system is managed. Thus, the licensing authority 510 could, for example, limit the set of serial numbers on the "approved borrowers" list to those who have the same ownership information as the original target device 100. Another possible solution to this problem is to require that any "borrower" device 720 be validated as an "authorized" borrower by presenting credentials (such as a signed certificate) to the lender which can be verified only by decrypting the certificate with the central Licensing Authority's 510 public key. This scenario would also, of course, involve the ability for the Licensing Authority 510 to revoke such a certificate in the case where a particular unit has been determined to be compromised. One well-understood method by which this certificate revocation process can be accomplished is via a regularly-published "revocation list".

Secret Key Discovery and Identity Verification Issues

If the primary secret key for a particular player is discovered by means of physical disassembly and chip die examination, then this should not compromise the security of any other device, since each device will have a distinct set of secret keys 104. However, if the primary key for a particular player were somehow compromised then it is potentially possible for an unlicensed device to masquerade as a legitimate target unit. In the case where this problem went undetected, the possibility exists that an unlicensed device armed with this knowledge could compromise any of the application specific decryption keys that were issued to that particular target unit. Since the target unit's 100 serial number 106 would have to have been registered in order for the licensing authority 510 to issue decryption keys to the device in the first place, the problem on this end would ostensibly be limited to the imitation of an otherwise legitimate target unit 100 by an unlicensed device.

If both of a unit's 100 secret keys were discovered by means of such a process, however, it is possible that it would be possible to compromise the security of all of the application specific keys which were licensed to that unit, based on an examination of previously backed up copies of the encrypted key list digests. For this reason, both the primary and the secondary secret keys should be implemented on target chip in a "tamper-proof" manner such that any attempt to discover the value of these keys results in the loss of the key data.

There are a number of means by which this tamper-proof feature could be implemented on the target device 100, but the exact implementation of such is not of consequence to the protocol described in this document. If a "secret key loss" situation were to occur through some innocent act of negligence (or abuse) on the part of the user, the legitimate user should be able to return their damaged unit to the licensing authority 510 who could arrange to have the damaged unit's application specific keys transferred to a new device. It should be noted, however, that in the case where the original target device 100 is non-functional, the transfer of the keys to a new target device 100 must involve a transaction with the application developer 520 (at least for those keys which were not supplied to the licensing authority 510 in the clear in the first place).

It should be noted, however, that a device which was able to impersonate an otherwise genuine target unit 100 could ostensibly be able to trick an unsuspecting legitimately licensed device into temporarily relinquishing ownership of one or more of its application-specific keys or into suspending operation (as was discussed earlier). If the latter were to occur, then the possibility exists of having a "rogue unit" which could disable all of the units that attempted to borrow a key from it. If the former were to occur, then any number of application or media specific keys could potentially be compromised.

Thus, the concept discussed earlier of limiting the number of potential "licensed borrowers" for a particular target unit 100 to a list which was only able to be supplied to the legitimate unit by means of a secure update from the licensing authority 510 server is a prudent one. In the former case, this will prevent the owners of otherwise unsuspecting units from having their legitimate devices disabled by a hacker who takes apart a functional unit to gain access to its secret keys unless that unit actually belonged to them in the first place. In the latter case, this will limit the transfer of application or media specific keys to only those devices that were at one point licensed devices that were properly registered with the licensing authority. Nonetheless, the determined hacker could still purchase a legitimate unit, crack it open and somehow gain access to its secret key data and then use this information to masquerade as a legitimate device.

So, the issue remains of how to try to detect this kind of an impersonation event. The only successful strategy to defeat an extremely well financed opponent of this nature is to design the system such that the potential gain is not worth the effort required, at least from a cost-tradeoff standpoint.

There are several means of attempting to prove the authenticity of an otherwise unknown device with which one is communicating. However, the most successful method for proving that a device is, in fact, what it claims to be is to focus on the characteristics that make this device unique from other devices. In the case of a special purpose apparatus, such as a digital decryption mechanism, such as that described by this document, it would be the ability for the device to properly execute the security protocol and to calculate the correct result based on a given set of input variables. Since the security protocol described herein is based on publicly known algorithms, however, this could ostensibly be accomplished by any general purpose computing device, given that is has enough time to complete the computation. In fact, this issue will be a potential problem for any device that is based on publicly available technology, if the secret key information that makes the device unique is somehow compromised. Thus, we must ultimately rely on the precept that the secret key information which is stored on-chip for all of the legitimate target devices must remain secret, even in the face of disassembly and chip die inspection.

We can certainly add requirements to the target identification and verification process such as the ability to correctly come up with a verifiable MAC value within a certain amount of time. We could make the procedure even harder by requiring that the final MAC value be encrypted multiple times. Thus, we could potentially limit the ability of the attacker to imitate a legitimate device in that they would be required to have access to (more general) computational resources that would normally be much more expensive than the cost of simply purchasing legitimate copies of the licenses themselves. In the case of a media stream player, we could also include the ability to correctly decode a portion of one or more of the media streams which the player is ostensibly designed to accommodate.

In any case, however, the whole process of digital copyright protection is a Turing problem. Thus, given sufficient time and resources, any digital copyright protection scheme can possibly be defeated by the determined opponent. This is even independent, of course, of the fact that access to the secret key information would definitely be a big advantage to the would-be attacker. The ability to keep a unit's secret keys from being compromised is therefore an important part of this security protocol.

CONCLUSIONS

The copyright protection protocol described above is unique in several ways. First is the fact that it does not attempt to prohibit the user from having the ability to make backup copies of their legally purchased application or media specific key data. Second, this protocol does not make a distinction between any kinds of digital data and thus, allows the security protocol to be updated as easily as the data streams that it is designed to protect. Third, this protocol allows the user to temporarily transfer ownership of their application or media specific key(s) to another unit that is capable of executing the protocol. Also, this protocol also provides the ability for the licensee to effect a permanent transfer of ownership from one target unit 100 to another. This last property allows the implementation of the consumer's legal "right of first sale" under this protocol.

In fact, one of the fundamental differences between the protocol described in this document and other copy protection schemes is that the security of this system depends not on controlling the ability to access a particular data set, but rather on the ability to control the act of expressing the ideas contained within that data set.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for protecting digital content, comprising:
receiving a first encrypted bitstream at a target device and a first digital signature associated with the first encrypted bitstream, wherein the target device has a hardware hashing block, a secure instruction cache, a processor configured to execute in a secured mode and a first key specific to the target device wherein the first key can be used by the processor only when the processor is executing in the secured mode and the processor can only be placed in the secured mode based on a final result of the hardware hashing block, and wherein the hardware hashing block is configured to execute a hashing function to completion independently of the processor without storing any data other than the final result in any memory accessible from the processor;
receiving decryption code associated with the first encrypted bitstream;
placing the decryption code in the secure instruction cache, wherein contents of the secure instruction cache are not modifiable and can only subsequently be executed by the processor;
receiving a first message digest associated with the decryption code;
verifying the decryption code that was placed in the secure instruction cache, wherein verifying the decryption code comprises hashing the decryption code using the hardware hashing block of the target device to produce a second message digest as the final result and comparing the second message digest to the first message digest; and
only if the first message digest matches the second message digest placing the processor of the target device in the secured mode, verifying the first encrypted bitstream using the hardware hashing block and the first digital signature and executing the decryption code in the secure instruction cache to decrypt the first encrypted bitstream using the first key to yield a first decrypted bitstream, wherein the second message digest is produced by the hardware hashing block and compared to the first message digest before the first encrypted bitstream is verified and before the decryption code is executed to decrypt the first encrypted bitstream.

2. The method of claim 1, wherein decrypting the first encrypted bitstream comprises in a first part, decrypting a first device specific compound key using the first key specific to the target device to yield a content specific key and in a second part, decrypting the first encrypted bitstream using the content specific key.

3. The method of claim 2, wherein if the first message digest does not match the second message digest, then the content specific key is not generated by decrypting the first device specific compound key using the first key specific to the target device in the first part, because the decryption code is prevented from executing.

4. The method of claim 2, wherein if the first message digest does not match the second message digest, then the content specific key is not generated correctly when decrypting the first device specific compound key using the first key specific to the target device in the first part because the resultant content specific key is calculated incorrectly by the decryption code.

5. The method of claim 2, wherein the decryption of the first encrypted content is done as an atomic operation such that if an interrupt occurs during decryption of the first encrypted bitstream an error results.

6. The method of claim 1, wherein the first key specific to the target device is stored in hardware of the target device that cannot be accessed unless the processor is executing in secured mode.

7. The method of claim 6, wherein the processor of the target device is placed in the secured mode if the first message digest matches the second message digest.

8. The method of claim 1, wherein the content specific key is stored in a secure location.

9. The method of claim 8, wherein the secure location is only writable during the decryption of the first device specific compound key decryption and only readable during the decryption, wherein the decryption operation is only allowed to execute from within a secured section of an Instruction-Cache associated with the processor.

10. A non-transitory tangible computer readable medium for protecting digital content, comprising instructions for:
receiving a first encrypted bitstream at a target device and a first digital signature associated with the first encrypted bitstream, wherein the target device has a hardware hashing block, a secure instruction cache, a processor configured to execute in a secured mode and a first key specific to the target device wherein the first key can be used by the processor only when the processor is executing in the secured mode and the processor can only be placed in the secured mode based on a final result of the hardware hashing block, and wherein the hardware hashing block is configured to execute a hashing function to completion independently of the processor without storing any data other than a final result in any memory accessible from the processor;
placing the decryption code in the secure instruction cache, wherein contents of the secure instruction cache are not modifiable and can only subsequently be executed by the processor;
receiving decryption code associated with the first encrypted bitstream;
receiving a first message digest associated with the decryption code;
verifying the decryption code that was placed in the secure instruction cache, wherein verifying the decryption code comprises hashing the decryption code using the hardware hashing block of the target device to produce a second message digest as the final result and comparing the second message digest to the first message digest; and
only if the first message digest matches the second message digest placing the processor of the target device in the secured mode, verifying the first encrypted bitstream using the hardware hashing block and the first digital signature and executing the decryption code in the secure instruction cache to decrypt the first encrypted bitstream using the first key to yield a first decrypted bitstream, wherein the second message digest is produced by the hardware hashing block and compared to the first message digest before the first encrypted bitstream is verified and before the decryption code is executed to decrypt the first encrypted bitstream.

11. The computer readable medium of claim 10, wherein decrypting the first encrypted bitstream comprises in a first part, decrypting a first device specific compound key using the first key specific to the target device to yield a content specific key and in a second part, decrypting the first encrypted bitstream using the content specific key.

12. The computer readable medium of claim 11, wherein if the first message digest does not match the second message digest, then the content specific key is not generated by decrypting the first device specific compound key using the first key specific to the target device in the first part, because the decryption code is prevented from executing.

13. The computer readable medium of claim 11, wherein if the first message digest does not match the second message digest, then the content specific key is not generated correctly when decrypting the first device specific compound key using the first key specific to the target device in the first part because the resultant content specific key is calculated incorrectly by the decryption code.

14. The computer readable medium of claim 11, wherein the decryption of the first encrypted content is done as an atomic operation such that if an interrupt occurs during decryption of the first encrypted bitstream an error results.

15. The computer readable medium of claim 10, wherein the first key specific to the target device is stored in hardware of the target device that cannot be accessed unless the processor is executing in secured mode.

16. The computer readable medium of claim 15, wherein the processor of the target device is placed in the secured mode if the first message digest matches the second message digest.

17. The computer readable medium of claim 10, wherein the content specific key is stored in a secure location.

18. The computer readable medium of claim 17, wherein the secure location is only writeable as a part of the decryption of the first device specific compound key decryption and only readable as a part of the decryption process, which itself is only allowed to execute from within a secured section of the Instruction-Cache of the processor.

19. A device, comprising:
a processor configured to execute in secured mode;
a processor memory accessible by the processor;
a secure instruction cache, wherein contents of the secure instruction cache are not modifiable and can only subsequently be executed by the processor;
hardware storing a first key specific to the device wherein the first key can be used by the processor only when the processor is executing in the secured mode; and
a hardware hashing block configured to execute a hashing function to completion independently of the processor without storing any data other than a final result in the processor memory and the processor can only be placed in the secured mode based on a final result of the hardware hashing block;
wherein the device is configured to:
receive a first encrypted bitstream and a first digital signature associated with the first encrypted bitstream,
place the decryption code in the secure instruction cache
receive decryption code associated with the first encrypted bitstream,
receive a first message digest associated with the decryption code,
verify the decryption code that was placed in the secure instruction cache, wherein verifying the decryption code comprises hashing the decryption code using the hardware hashing block of the device to produce a second message digest as the final result and comparing the second message digest to the first message digest, and
only if the first message digest matches the second message digest placing the processor of the device in the secured mode, verifying the first encrypted bitstream using the hardware hashing block and the first digital signature and executing the decryption code in the secure instruction cache to decrypt the first encrypted bitstream using the first key to yield a first decrypted bitstream, wherein the second message digest is produced by the hardware hashing block and compared to the first message digest before the first encrypted bitstream is verified and before the decryption code is executed to decrypt the first encrypted bitstream.

20. The device of claim 19, wherein decrypting the first encrypted bitstream comprises in a first part, decrypting a first device specific compound key using the first key specific to the target device to yield a content specific key and in a second part, decrypting the first encrypted bitstream using the content specific key.

21. The device of claim 20, wherein if the first message digest does not match the second message digest, then the content specific key is not generated by decrypting the first device specific compound key using the first key specific to the target device in the first part, because the decryption code is prevented from executing.

22. The device of claim 20, wherein if the first message digest does not match the second message digest, then the content specific key is not generated correctly when decrypting the first device specific compound key using the first key specific to the target device in the first part because the resultant content specific key is calculated incorrectly by the decryption code.

23. The device of claim 20, wherein the decryption of the first encrypted content is done as an atomic operation such that if an interrupt occurs during decryption of the first encrypted bitstream an error results.

24. The device of claim 19, wherein the device comprises a hardware location for storing the first key specific to the target device and the hardware location cannot be accessed unless the processor is executing in secured mode.

25. The device of claim 24, wherein the processor of the target device is placed in the secured mode if the first message digest matches the second message digest.

26. The device of claim 19, wherein the content specific key is stored in a secure location.

27. The device of claim 26, wherein the secure location is only writeable as a part of the decryption of the first device specific compound key decryption and only readable as a part of the decryption process, which itself is only allowed to execute from within a secured section of the Instruction-Cache of the processor.

28. The device of claim 19, wherein the processor of the device is placed in the secured mode only if the first message digest matches the second message digest produced by the hardware hashing block and the processor is placed in the secured mode before the first encrypted bitstream is verified and before the decryption code is executed to decrypt the first encrypted bitstream.

29. A device, comprising:
a processor that enters an unsecured mode when reset and is configured to be placed in a secured mode without a reset;
a processor memory accessible by the processor;
a secure instruction cache, wherein contents of the secure instruction cache are not modifiable and can only subsequently be executed by the processor;
hardware storing a first key specific to the device wherein the first key can be used by the processor only when the processor is executing in the secured mode; and
a hardware hashing block configured to execute a hashing function to completion independently of the processor without storing any data other than a final result in the processor memory and the processor does not enter the secured mode when reset and can only be placed in the secured mode based on a final result of the hardware hashing block;

wherein the device is configured to:
receive a first encrypted bitstream and a first digital signature associated with the first encrypted bitstream,
place the decryption code in the secure instruction cache
receive decryption code associated with the first encrypted bitstream,
receive a first message digest associated with the decryption code,
verify the decryption code that was placed in the secure instruction cache, wherein verifying the decryption code comprises hashing the decryption code using the hardware hashing block of the device to produce a second message digest as the final result and comparing the second message digest to the first message digest, and
only if the first message digest matches the second message digest placing the processor of the device in the secured mode, verifying the first encrypted bitstream using the hardware hashing block and the first digital signature and executing the decryption code in the secure instruction cache to decrypt the first encrypted bitstream using the first key to yield a first decrypted bitstream, wherein the second message digest is produced by the hardware hashing block and compared to the first message digest before the first encrypted bitstream is verified and before the decryption code is executed to decrypt the first encrypted bitstream.

* * * * *